US008817753B2

(12) United States Patent
Kawamura et al.

(10) Patent No.: US 8,817,753 B2
(45) Date of Patent: Aug. 26, 2014

(54) MOBILE TERMINAL APPARATUS AND RADIO COMMUNICATION METHOD

(75) Inventors: Teruo Kawamura, Tokyo (JP); Yoshihisa Kishiyama, Tokyo (JP); Mamoru Sawahashi, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 298 days.

(21) Appl. No.: 13/266,019

(22) PCT Filed: Apr. 20, 2010

(86) PCT No.: PCT/JP2010/056978
§ 371 (c)(1),
(2), (4) Date: Feb. 3, 2012

(87) PCT Pub. No.: WO2010/125943
PCT Pub. Date: Nov. 4, 2010

(65) Prior Publication Data
US 2012/0127961 A1 May 24, 2012

(30) Foreign Application Priority Data

Apr. 27, 2009 (JP) ................................ 2009-108518
Aug. 17, 2009 (JP) ................................ 2009-188761

(51) Int. Cl.
*H04W 72/04* (2009.01)
(52) U.S. Cl.
USPC ............ 370/335; 370/329; 370/343; 370/342
(58) Field of Classification Search
USPC .......... 370/335, 330, 328, 252; 455/450, 451, 455/452.2, 452.1, 442, 509
See application file for complete search history.

(56) References Cited

U.S. PATENT DOCUMENTS

| 8,140,929 B2 * | 3/2012 | Kim et al. ..................... 714/749 |
| 8,175,110 B2 * | 5/2012 | Suzuki .......................... 370/465 |
| 8,457,091 B2 * | 6/2013 | Pani et al. ..................... 370/342 |
| 2002/0141367 A1 | 10/2002 | Hwang et al. |
| 2006/0221883 A1 * | 10/2006 | Damnjanovic et al. ....... 370/315 |

(Continued)

FOREIGN PATENT DOCUMENTS

| JP | 2006-203945 A | 8/2006 |
| JP | 2006-211063 A | 8/2006 |
| JP | 2009-49578 A | 3/2009 |
| WO | 2009/022566 A1 | 2/2009 |

OTHER PUBLICATIONS

Notification of Reasons for Rejection for Japanese Patent Application No. 2009-188761 mailed May 15, 2012, with English translation thereof (7 pages).

(Continued)

*Primary Examiner* — Rasheed Gidado
(74) *Attorney, Agent, or Firm* — Osha Liang LLP

(57) ABSTRACT

To provide a mobile terminal apparatus and radio communication method for enabling feedback control information to be efficiently transmitted on uplink channels, a radio communication method of the invention is characterized by having in a mobile terminal apparatus the steps of receiving a signal for each of a plurality of component carriers from a radio base station apparatus, generating feedback control information for each component carrier from the signal, mapping the feedback control information for each component carrier to suitable radio resources based on the number of component carriers, the presence or absence of uplink transmission data, and the number of bits of control information to transmit as feedback, and transmitting an uplink transmission signal mapped to the radio resources.

13 Claims, 26 Drawing Sheets

(56) References Cited

U.S. PATENT DOCUMENTS

| | | | |
|---|---|---|---|
| 2010/0098012 A1* | 4/2010 | Bala et al. | 370/329 |
| 2010/0118817 A1* | 5/2010 | Damnjanovic et al. | 370/329 |
| 2010/0208679 A1* | 8/2010 | Papasakellariou et al. | 370/329 |

OTHER PUBLICATIONS

Nokia Siemens Networks, Nokia, 3GPP TSG RAN WG1 Meeting #49bis, R1-073001, "PUCCH sequence modulation sequences," Orlando, USA, Jun. 25-29, 2007 (5 pages).

Samsung, 3GPP TSG RAN WG1 #56bis, R1-091238, "UL ACK/NAK Transmission in LTE-A," Seoul, Korea, Mar. 23-27, 2009 (3 pages).

Notification of Reasons for Rejection issued in parent Japanese Patent Application No. 2009-188761, dispatched on Aug. 9, 2011, with translation, 6 pages.

3GPP TR 25.912 V7.1.0, Sep. 2006, "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)," 57 pages.

ZTE, "Uplink Control Channel Design for LTE-Advanced," TSG-RAN WG1 #56bis, R1-091427, Mar. 23-27, 2009, 6 pages.

Abstract of JP2006211063(A) published Aug. 10, 2006, from the Espacenet Worldwide Database, 1 page.

LG Electronics, "Some aspects of PUCCH/PUSCH transmission over multiple component carriers," 3GPP TSG RAN WG1 #55bis, R1-090208, Jan. 12-16, 2009, 5 pages.

NEC Group, "On component carrier types and support for LTE-A features," 3GPP TSG-RAN WG1 Meeting #56, R1-090646, Feb. 9-13, 2009, 4 pages.

International Search Report issued in PCT/JP2010/056978, mailed on Jul. 27, 2010, with translation, 4 pages.

Notification of Reasons for Rejection w/translation issued for Japanese Patent Application No. 2009-188761, dated Feb. 26, 2013, (7 pages).

Huawei; "PUCCH design for carrier aggregation"; 3GPP TSG RAN WG1 Meeting #56bis, R1-091275; Seoul, Republic of Korea, Mar. 23-27, 2009 (8 pages).

Samsung; "Multiplexing of ACK/NACK, CQI & SR in LTE-A"; 3GPP TSG RAN WG1 Meeting #56bis, R1-091242; Seoul Korea, Mar. 23-27, 2009 (2 pages).

ZTE; "ACK/NACK transmission in PUCCH format 2a & 2b"; 3GPP TSG-RAN WG1 #53bis, R1-082369; Warsaw, Poland, Jun. 30-Jul. 4, 2008 (3 pages).

3GPP TS 36.213 V8.5.0; 3rd Generation Partnership Project; Technical Specification Group Radio Access Network; Evolved Universal Terrestrial Radio Access (E-UTRA); Physical layer procedures (Release 8); Dec. 2008 (74 pages).

3GPP TS 36.211 V8.5.0; "3rd Generation Partnership Project; Technical Specification Group Radio Access Network; Evolved Universal Terrestrial Radio Access (E-UTRA); Physical Channels and Modulation (Release 8)"; Dec. 2008 (82 pages).

Notice of Preliminary Rejection issued in Korean Application No. 20120003479, dated Nov. 22, 2012, (5 pages).

Office Action issued in Mexican Application No. MX2011011271, dated Sep. 4, 2012, (2 pages).

Abstract of JP2009049578(A) published Mar. 5, 2009, from the Espacenet Worldwide Database, 2 pages.

Notice of Preliminary Rejection issued for Korean Application No. 10-2011-7026524, dated Nov. 22, 2012 (5 pages).

* cited by examiner

MOBILE TERMINAL APPARATUS AND RADIO COMMUNICATION METHOD

TECHNICAL FIELD

The present invention relates to a mobile terminal apparatus and radio communication method in the next-generation mobile communication system.

BACKGROUND ART

In UMTS (Universal Mobile Telecommunications System) networks, for the purpose of improving bandwidth utilization, peak data rates, etc., by adopting HSDPA (High Speed Downlink Packet Access) and HSUPA (High Speed Uplink Packet Access), it is performed exploiting maximum features of the system based on W-CDMA (Wideband Code Division Multiple Access). For the UMTS network, for the purpose of further increasing bandwidth utilization and peak data rates, reducing delay and the like, Long Term Evolution (LTE) has been studied (Non-patent Document 1). In LTE, as distinct from W-CDMA, as a multiple access scheme, the scheme based on OFDMA (Orthogonal Frequency Division Multiple Access) is used in downlink, and the scheme based on SC-FDMA (Single Carrier Frequency Division Multiple Access) is used in uplink.

As shown in FIG. 1, signals transmitted in uplink are mapped to appropriate radio resources, and are transmitted from a mobile terminal apparatus to a radio base station apparatus. In this case, user data (UE (User Equipment) #1, UE #2) is assigned to the uplink shared channel (PUSCH: Physical Uplink Shared Channel), and control information is time-division multiplexed with the PUSCH when the control information is transmitted concurrently with the user data, while being assigned to the uplink control channel (PUCCH: Physical Uplink Control Channel) when only the control information is transmitted. The control information transmitted in uplink includes downlink quality information (CQI: Channel Quality Indicator), retransmission acknowledgment (ACK/NACK) of the downlink shared channel, etc.

In the PUCCH, typically, different subframe structures are adopted between the case of transmitting the CQI and the case of transmitting ACK/NACK (FIGS. 2(a), 2(b)). In the subframe structure of the PUCCH, one slot (1/2 subframe) contains 7 SC-FDMA symbols. Further, one SC-FDMA symbol contains 12 information symbols (subcarriers). More specifically, as shown in FIG. 2(a), in the subframe structure of the CQI (CQI format), a reference signal (RS) is multiplexed into a second symbol (#2) and sixth symbol (#6), and the control information (CQI) is multiplexed into the other symbols (first symbol, third to fifth symbols, seventh symbol) in a slot. Meanwhile, as shown in FIG. 2(b), in the subframe structure of ACK/NACK (ACK/NACK format), a reference signal (RS) is multiplexed into third symbol (#3) to fifth sixth symbol (#5), and the control information (ACK/NACK) is multiplexed into the other symbols (first symbol (#1), second symbol (#2), sixth symbol (#6), seventh symbol (#7)) in a slot. In one subframe, the slot is repeated twice. Further, as shown in FIG. 1, the PUCCH is multiplexed into radio resources at opposite edges of the system band, and frequency hopping (Inter-slot FH) is applied between two slots having different frequency bands in one subframe. In the subframe structure of the PUSCH, one slot contains 7 SC-FDMA symbols. Further, the transmission bandwidth of the PUSCH is determined by instructions of the base station (frequency scheduling), and typically, one SC-FDMA symbol transmits more information symbols than on the PUCCH corresponding to the assigned bandwidth. More specifically, as shown in FIG. 2(c), a reference signal (RS) is multiplexed into a fourth symbol (#4), and data and control information is time-division multiplexed into the other symbols (first symbol to third symbol, fifth symbol to seventh symbol) in a slot. In addition, the slot is repeated twice in one subframe. As in the PUCCH, it is possible to apply frequency hopping between slots.

CITATION LIST

Non-Patent Literature

[Non-patent Literature 1] 3GPP, TR25.912 (V7.1.0), "Feasibility study for Evolved UTRA and UTRAN", September 2006

SUMMARY OF INVENTION

Technical Problem

In the 3G system (W-CDMA), a fixed band of 5 MHz is substantially used, and it is possible to achieve transmission rates of approximately maximum 2 Mbps in downlink. Meanwhile, in the LTE scheme system, using variable bands ranging from 1.4 MHz to 20 MHz, it is possible to achieve transmission rates of maximum 300 Mbps in downlink and about 75 Mbps in uplink. Further, in the UMTS network, for the purpose of further improving bandwidth utilization, peak data rates, etc. successor systems to LTE have been studied (for example, LTE Advanced (LTE-A)).

In the LTE-A system, for the purpose of further improving bandwidth utilization, peak throughput, etc., assignments of frequencies with wider bands than in LTE have been studied. Further, in LTE-A, having Backward Compatibility with LTE is one of requirements, and therefore, adopted is a configuration of a transmission band with a plurality of base frequency blocks (component carriers: CC) each having a bandwidth capable of being used in LTE. Therefore, the feedback control information for a data channel transmitted by a plurality of downlink CCs increases by number-of-CC times in a simplistic manner. Further, in addition to these types of information, techniques specific to LTE-A have been studied such as coordinated multi-point transmission/reception techniques and MIMO (Multiple Input Multiple Output) techniques using more transmitting/receiving antennas than in LTE, and it is conceivable that the feedback control information to control the techniques increases. Therefore, since the information amount of the feedback control information increases, it is necessary to study transmission methods of feedback control information on uplink channels.

The present invention was made in view of such a respect, and it is an object of the invention to provide a mobile terminal apparatus and radio communication method for enabling feedback control information to be efficiently transmitted on uplink channels.

Solution to Problem

A mobile terminal apparatus of the invention is characterized by having a reception section configured to receive a signal for each of a plurality of component carriers from a radio base station apparatus, a feedback control information generating section configured to generate feedback control information for each component carrier from the signal, and a mapping section configured to map the feedback control information for each component carrier to a suitable radio resource based on the number of component carriers, the presence or absence of uplink transmission data, and the number of bits of control information to transmit as feedback.

A radio communication method of the invention is characterized by having in a mobile terminal apparatus the steps of receiving a signal for each of a plurality of component carriers from a radio base station apparatus, generating feedback control information for each component carrier from the signal, mapping the feedback control information for each component carrier to a suitable radio resource based on the number of component carriers, the presence or absence of uplink transmission data, and the number of bits of control information to transmit as feedback, and transmitting an uplink transmission signal mapped to the radio resource.

Advantageous Effects of the Invention

According to the invention, the mobile terminal apparatus receives a signal for each of a plurality of component carriers from a radio base station apparatus, generates feedback control information for each component carrier from the signal, performs mapping of the feedback control information for each component carrier to suitable radio resources based on the number of component carriers, the presence or absence of uplink transmission data, and the number of bits of control information to transmit as feedback, and transmits an uplink transmission signal mapped to the radio resources, and it is thereby possible to efficiently transmit the feedback control information on uplink channels.

DESCRIPTION OF EMBODIMENTS

Embodiments of the invention will specifically be described below with reference to accompanying drawings. In the invention, a mobile terminal apparatus receives a signal for each of a plurality of component carriers from a radio base station apparatus, generates feedback control information for each component carrier from the signal, performs mapping of the feedback control information for each component carrier to a suitable radio resource, and transmits an uplink transmission signal mapped to the radio resource. Herein, when the feedback control information for each component carrier is mapped to a radio resource, mapping is performed based on the number of component carriers, the presence or absence of the uplink transmission data, and the number of bits of control information to transmit as feedback.

As described above, in the above-mentioned LTE-A system that is a successor system to the LTE system, the feedback control information for a data channel transmitted by a plurality of downlink CCs increases by number-of-CC times in a simplistic manner. Further, the feedback information is conceivable for techniques that are adopted only for LTE-A, and as a whole, the types of feedback information also increase. Thus, when the information amount and types of the feedback information increase, it is necessary to make the transmission method in uplink channels more efficient.

Therefore, in view of such a respect, the inventor of the invention proposed the method of transmitting the feedback control information efficiently on the uplink channel in FIGS. 3 to 9.

Figure 3:
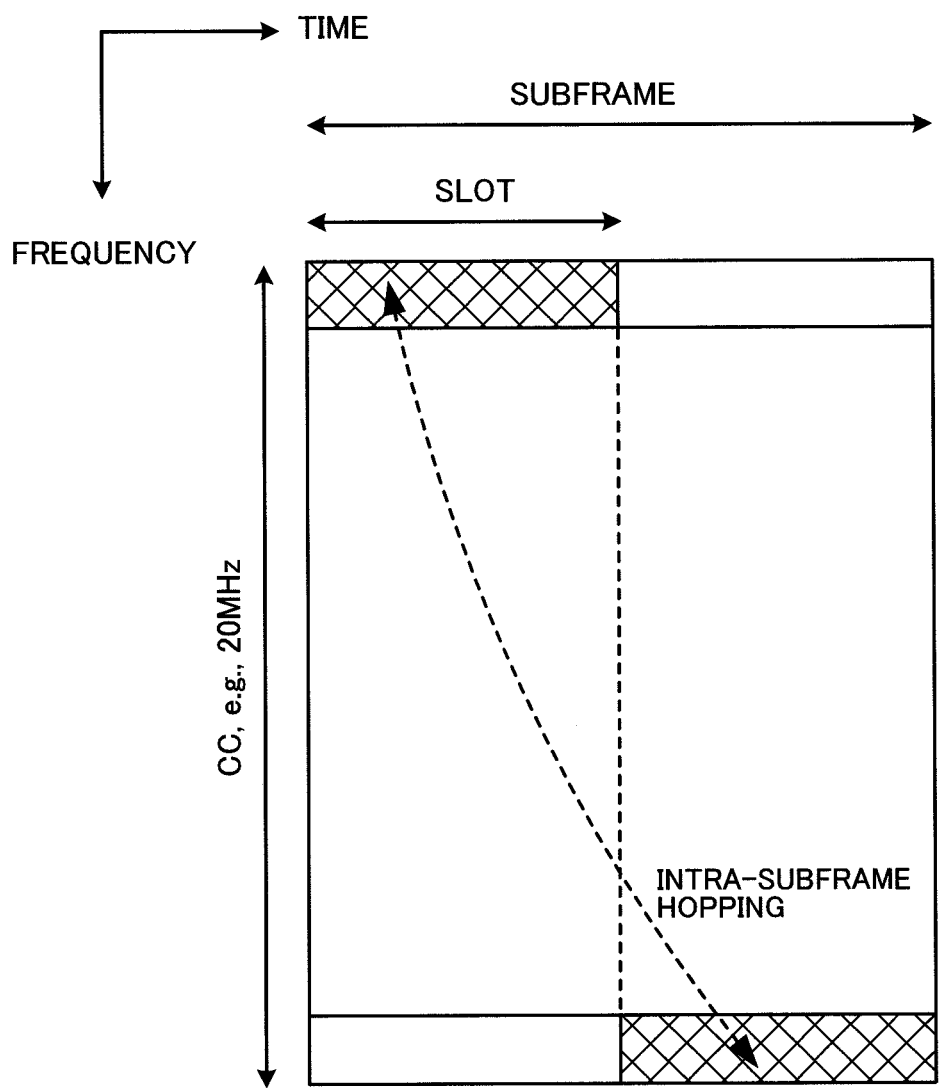
FIG. 3 is a diagram to explain a format to transmit uplink control information in a mobile terminal apparatus according to an Embodiment of the invention.

On the PUCCH in LTE, transmission is performed only using a single radio resource to actualize single-carrier transmission, and as a modulation scheme of the control information, BPSK or QPSK is applied. As the method of transmitting feedback control information efficiently on the uplink channel, first, as shown in FIG. 3, there is the method of transmitting using a single radio resource (PUCCH). In this case, M-ary data modulation (8PSK (8-Phase Shift Keying), 16QAM (16 Quadrature Amplitude Modulation), etc.) is applied (Method 1). In other words, the feedback control information is subjected to M-ary data modulation, and the feedback control information subjected to M-ary data modulation is mapped to the PUCCH (uplink control channel). By this means, as compared with the case of using QPSK modulation in LTE, it is possible to transmit 1.5-times and 2-times information amounts respectively by the single radio resource. Further, in this format, to obtain frequency diversity, inter-slot frequency hopping (Inter-slot FH: Intra-subframe hopping) is adopted.

Figure 4:
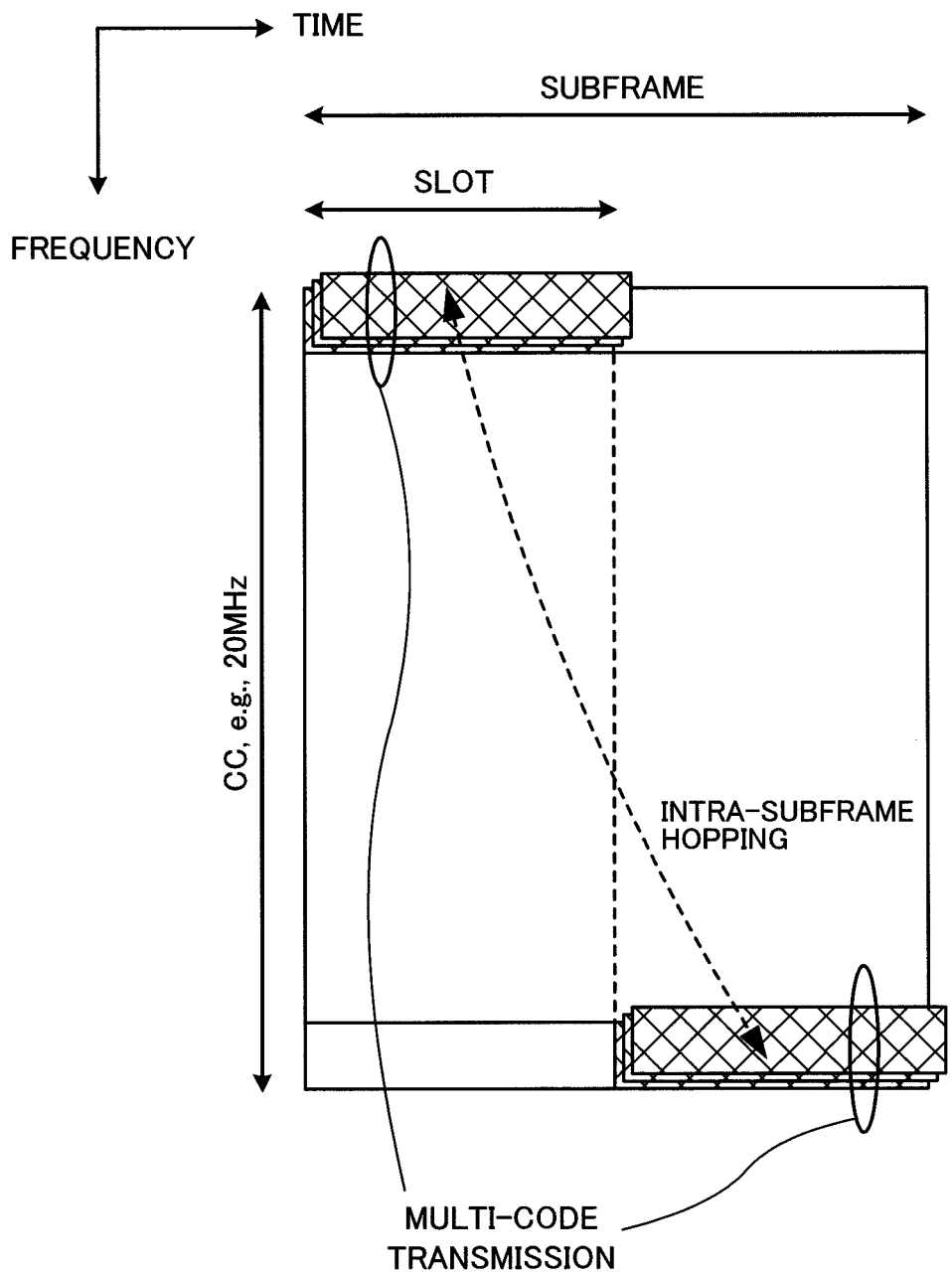
FIG. 4 is another diagram to explain the format to transmit the uplink control information in the mobile terminal apparatus according to the Embodiment of the invention.
Figure 5:
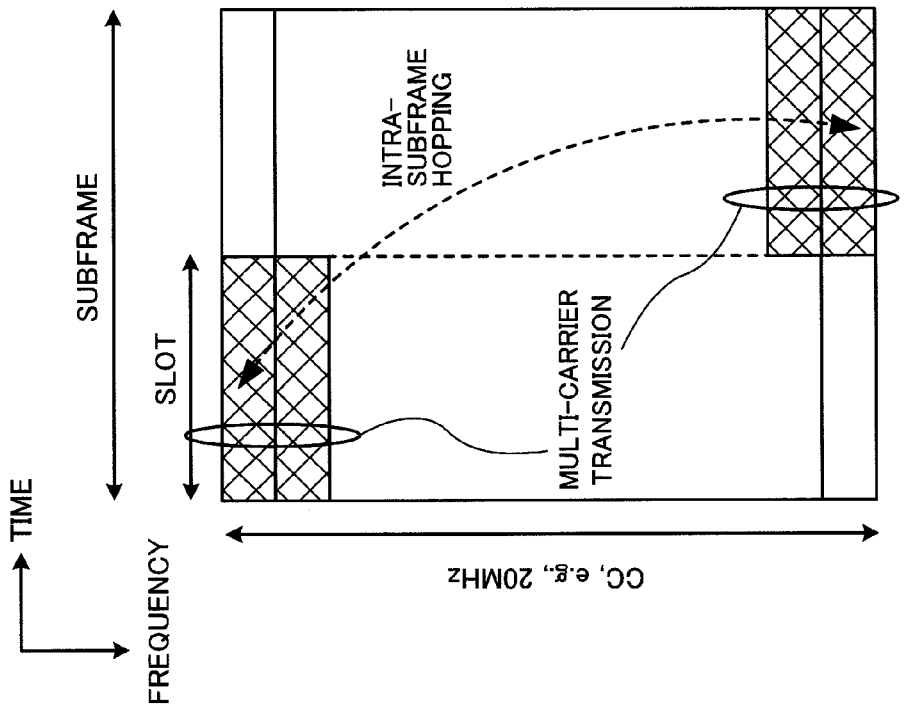
FIGS. 5(a) and 5(b) are other diagrams to explain the format to transmit the uplink control information in the mobile terminal apparatus according to the Embodiment of the invention.
Figure 5:
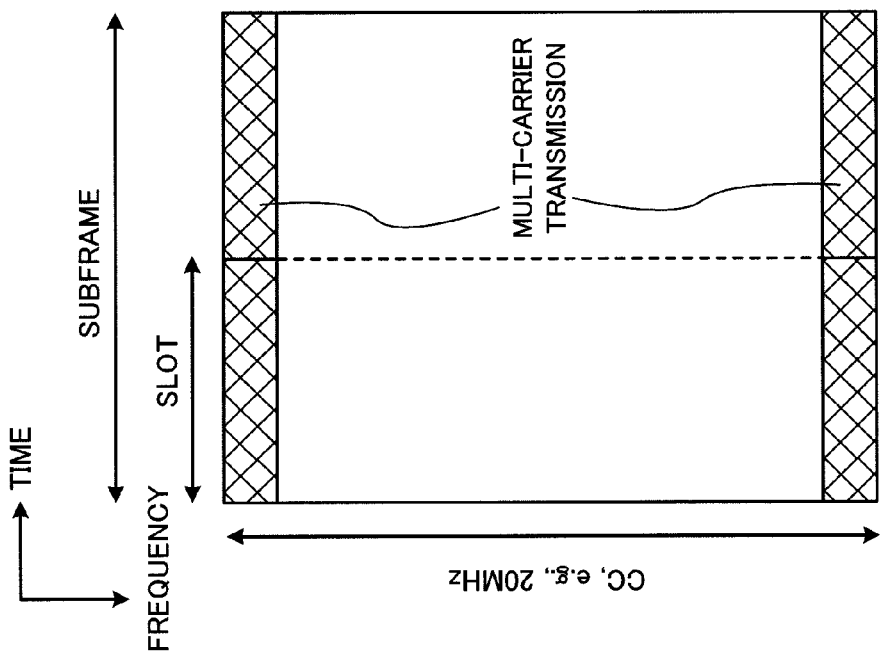
Figure 6:
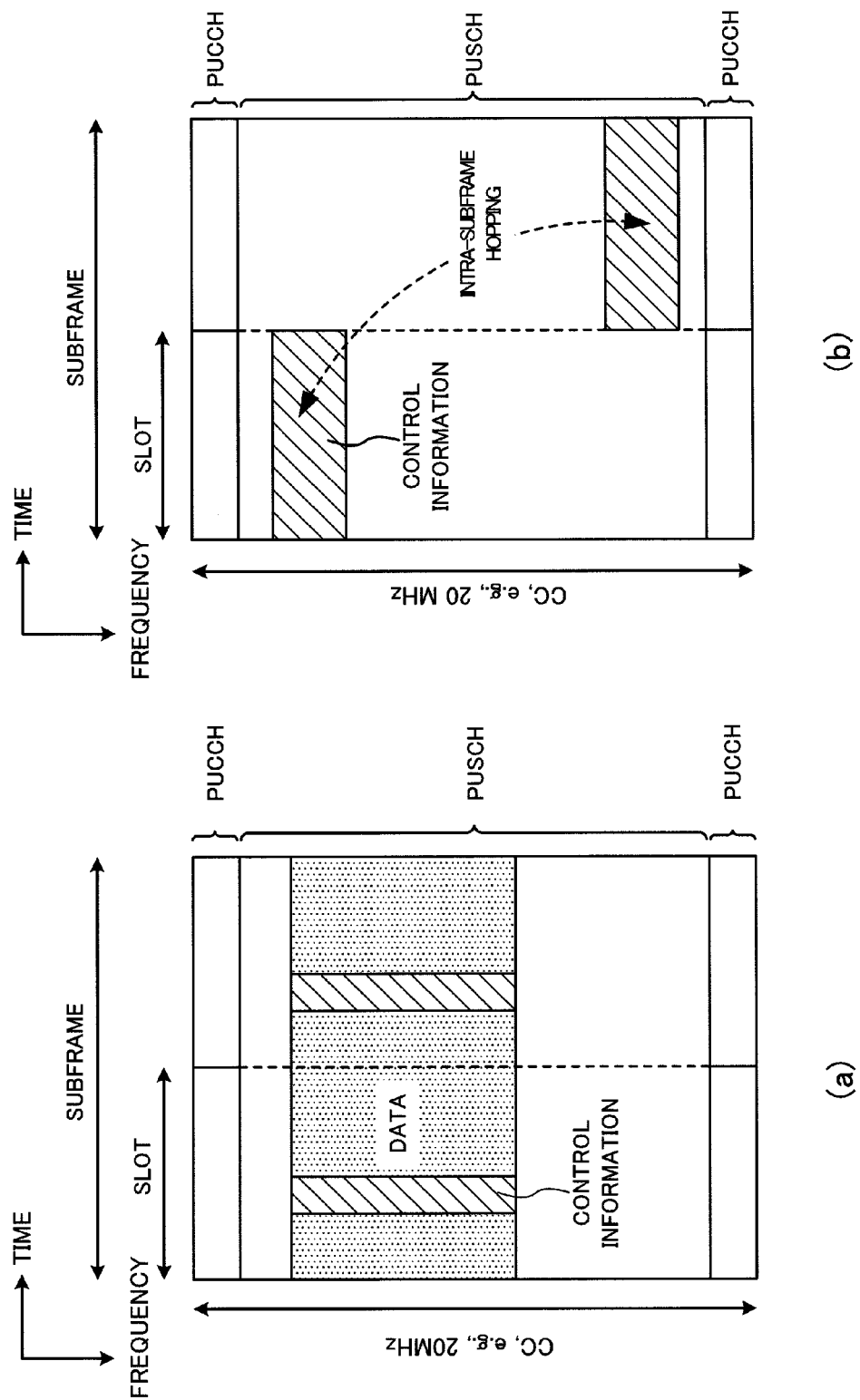
FIGS. 6(a) and 6(b) are other diagrams to explain the format to transmit the uplink control information in the mobile terminal apparatus according to the Embodiment of the invention.

Next, as shown in FIGS. 4 and 5, there is the method of transmitting using a plurality of radio resources. In this case, as shown FIG. 4, multi-code transmission may be performed (Method 2). Alternately, as shown in FIGS. 5(a) and 5(b), multi-carrier transmission is performed (Method 3). In other words, as shown in FIG. 4, the feedback control information may be code-division multiplexed and mapped into the same frequency/time radio resources (resource blocks) of the PUCCH to multi-code transmit. Alternately, as shown in FIGS. 5(a) and 5(b), the feedback control information may be multi-carrier transmitted using different resource blocks in a subframe of the PUCCH. Further, to obtain frequency diversity gain, inter-slot frequency hopping is adopted.

In LTE, when the data signal and control signal are concurrently transmitted, the data signal and control signal are time-division multiplexed and transmitted on the PUSCH, and in this case, the channel-coding rate and modulation scheme of the control information are uniquely determined from channel-coding rates and modulation scheme to apply to the data signal. As a method of efficiently transmitting the feedback control information on the PUSCH, as shown in FIGS. 6(a) and 6(b), there is the method of transmitting using a single radio resource (PUSCH). In the case as shown in FIG. 6(a), data and feedback control information is time-division multiplexed to one slot of the PUSCH (Method 4). In this case, irrespective of the data signal, the modulation scheme and channel-coding rate are determined corresponding to the size of the feedback control information to transmit. In other words, in this format, irrespective of the data signal, by applying high data modulation and high coding rate, as compared with the case of LTE, it is possible to transmit more information amounts of control signals.

In the case as shown in FIG. 6(b), also when data transmission does not exist, radio resources to transmit the feedback control information are allocated to the PUSCH (Method 5). In this case, corresponding to the size of feedback control information, the transmission bandwidth (the number of resource blocks), modulation scheme, coding rate and the like may be switched adaptively. Further, in the format as shown in FIG. 6(b), to obtain frequency diversity gain, inter-slot frequency hopping is adopted. In the case as shown in FIG. 6(b), as in the feedback control information to be mapped to the PUCCH, such a configuration may be adopted that a plurality of users is orthogonally multiplexed (block spreading multiplexing, cyclic shift multiplexing) into the same radio resource (Method 6). In this case, to actualize orthogonal multiplexing, the subframe structure (for example, the number of SC-FDMA symbols per slot to multiplex RS) of the PUSCH may be varied. Since it is possible to multiplex a plurality of users into the same radio resource, it is possible to reduce overhead of a radio resource for feedback control information transmission.

Figure 7:
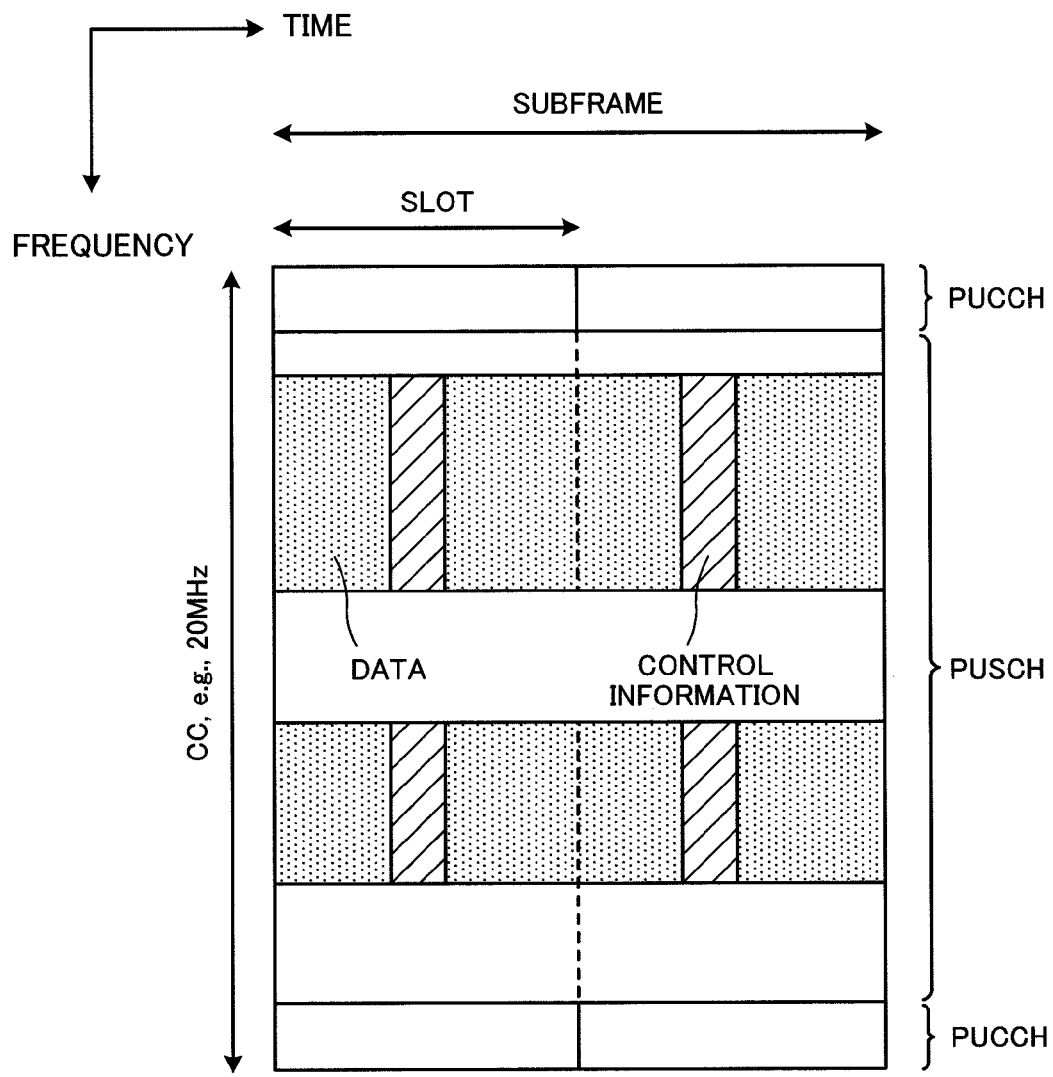
FIG. 7 is still another diagram to explain the format to transmit the uplink control information in the mobile terminal apparatus according to the Embodiment of the invention.
Figure 8:
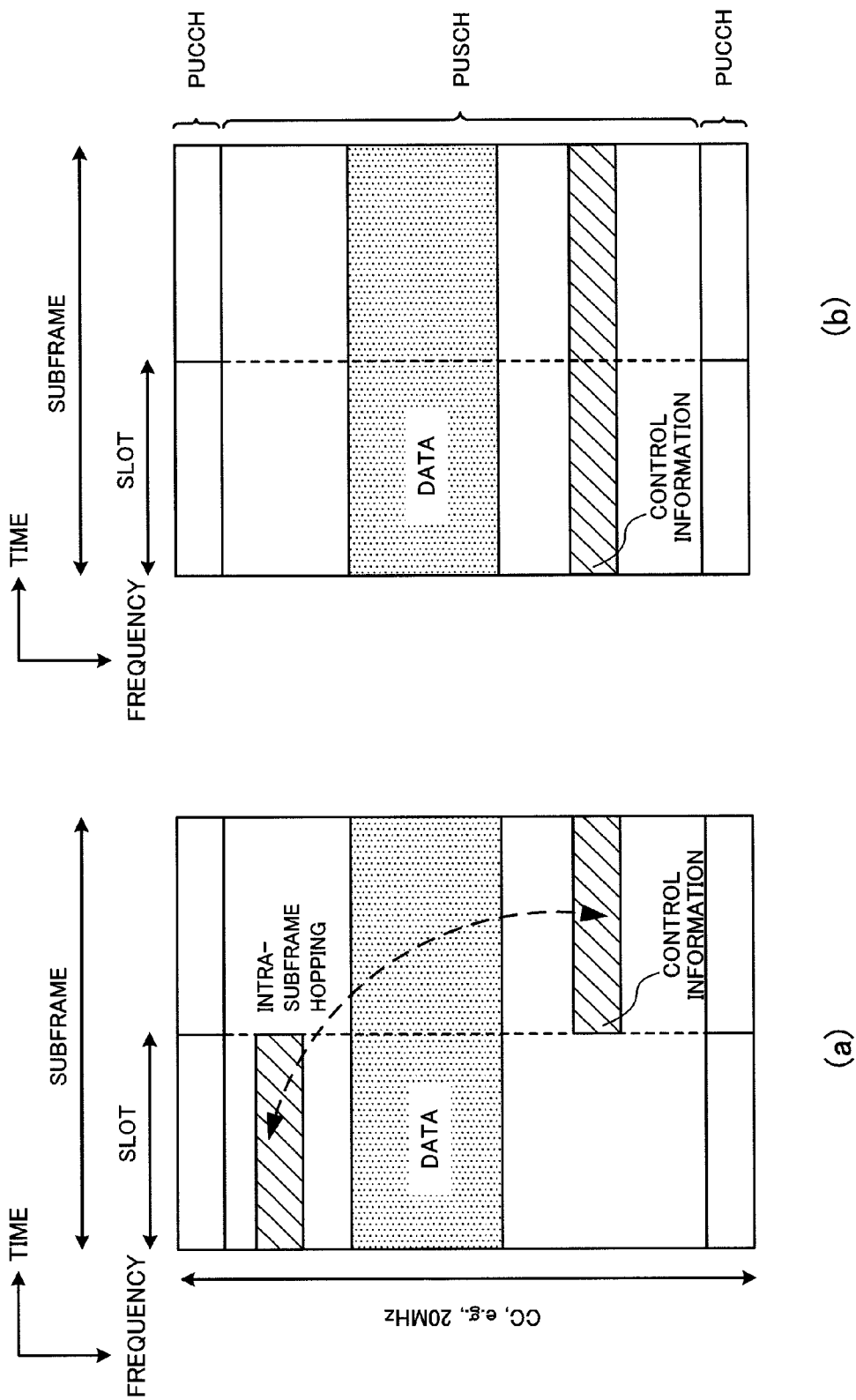
FIGS. 8(a) and 8(b) are other diagrams to explain the format to transmit the uplink control information in the mobile terminal apparatus according to the Embodiment of the invention.
Figure 9:
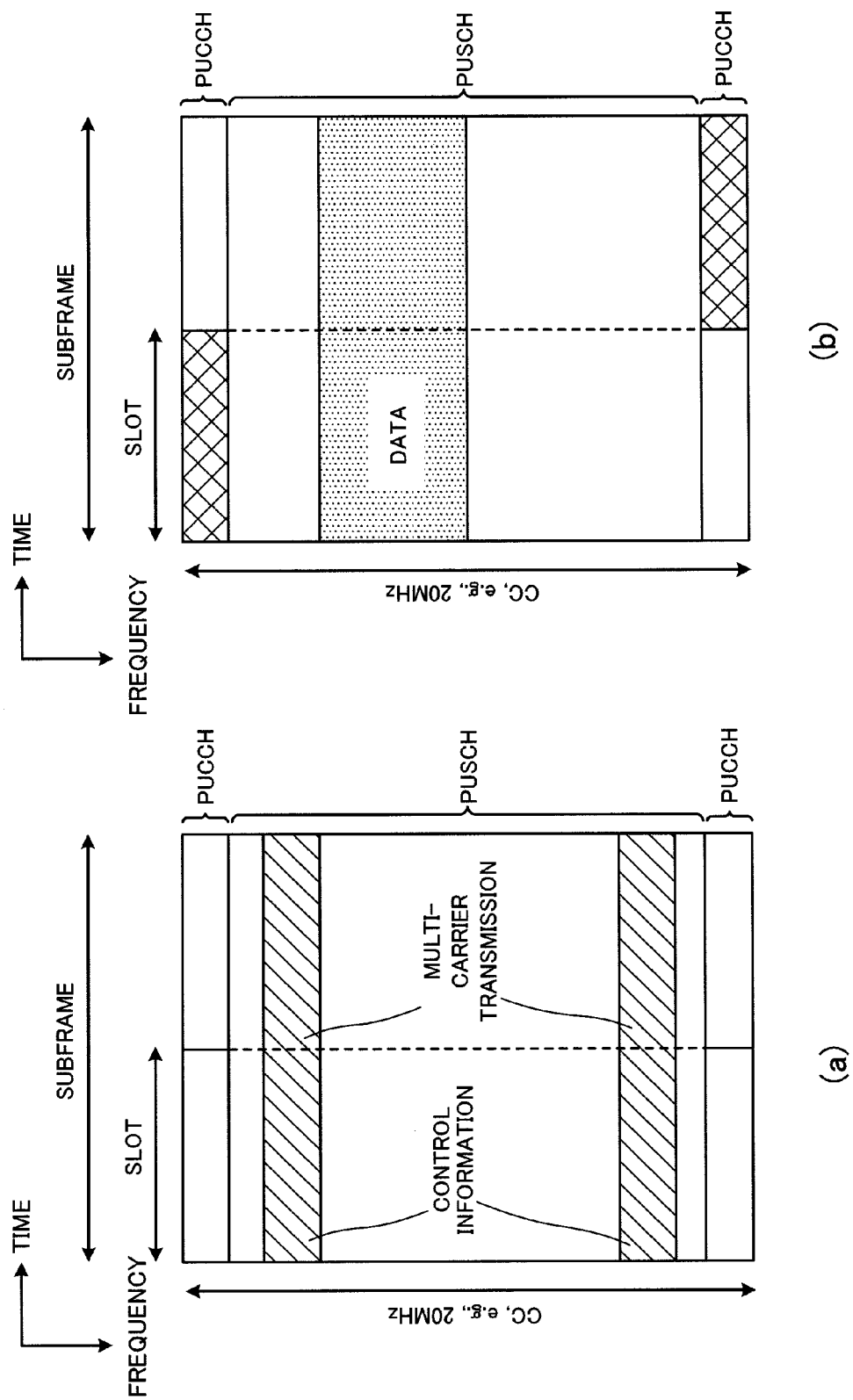
FIGS. 9(a) and 9(b) are other diagrams to explain the format to transmit the uplink control information in the mobile terminal apparatus according to the Embodiment of the invention.

Next, as shown in FIGS. 7 to 9, there is the method of transmitting using a plurality of radio resources. In this case, multi-carrier transmission is applied. For example, as shown in FIG. 7, cluster transmission may be performed in which the data and feedback control information is time-division multiplexed into each of discrete resources blocks in frequency in one subframe of the PUSCH to be multi-carrier transmitted (Method 7). By this cluster transmission, it is possible to ease constrains of single carrier, and allow the assignment of discrete resource blocks to transmit. Further, in this case, irrespective the data signal, it is possible to determine the modulation scheme and channel-coding rate corresponding to the size of the feedback control information to transmit.

Further, as shown in FIGS. 8(a) and 8(b), in the case where the data signal and control signal are concurrently transmitted, radio resources to transmit the feedback control information may be allocated in the region of the PUSCH, separately from radio resources to transmit the data signal (Method 8). In the format as shown in FIG. 8(a), for the radio resources allocated for transmission of control information, to obtain frequency diversity gain, inter-slot frequency hopping is adopted. In the formats as shown in FIGS. 8(a) and 8(b), it is possible to switch the transmission bandwidth (the number of resource blocks), modulation scheme, coding rate and the like corresponding to the size of the feedback control information. Further, the radio resources allocated for transmission of the feedback information may be shared among a plurality of users to accommodate the users by orthogonal multiplexing.

Furthermore, as shown in FIG. 9, in a state in which data transmission is not performed, radio resources to transmit the feedback control information may be allocated in the region of the PUSCH for cluster transmission (Method 9). In this case, corresponding to the size of the feedback control information, it is possible to switch the transmission bandwidth (the number of resource blocks), modulation scheme, coding rate and the like. Further, the radio resources allocated for transmission of the feedback information may be shared among a plurality of users to accommodate the users by orthogonal multiplexing.

Moreover, as shown in FIG. 9(b), there is the method of transmitting the feedback control information on the PUCCH, and allocating radio resources to transmit the data in the region of the PUSCH to transmit. In this case, on the PUCCH for transmitting the control information, M-ary data modulation (8 PSK, 16QAM, etc.) is applied (Method 10). Further, in this format, to obtain frequency diversity, inter-slot frequency hopping is adopted.

The transmission method of the feedback control information as described above is determined based on the number of component carriers, the presence or absence of uplink transmission data, and the number of bits of control information to transmit as feedback. For example, when uplink data transmission is not performed, the number of assigned CCs in downlink is one, and the techniques of the LTE-A system (coordinated multi-point transmission/reception techniques, MIMO techniques using the higher number of transmitting/receiving antennas than in LTE, etc.) are applied, it is possible to apply the above-mentioned Methods 1, 2, 3, 5, 6 and 9. Among the Methods, for the purpose of suppressing increases in PAPR (expanding coverage), the Methods 5 and 6 (single-carrier transmission) are excellent. Further, from the viewpoint of reducing modifications from the LTE system as possible, the Methods 1, 2 and 3 are excellent. Meanwhile, when uplink data transmission is not performed, the number of assigned CCs in downlink is one, and the techniques of the LTE-A system are not applied, since the information amount is the same as in LTE, the control information is transmitted using the conventional LTE format.

Further, when uplink data transmission is not performed, the number of assigned CCs in downlink is two or more, and the techniques of the LTE-A system are applied (the feedback control information amount is the highest when uplink data transmission is not performed), it is possible to apply the above-mentioned Methods 1, 2, 3, 5, 6 and 9. Among the Methods, the Methods 5, 6 and 9 (method for enabling the transmission band to be varied adaptively as distinct from the PUCCH) are desirable for transmission of the feedback control information of large size. Meanwhile, when uplink data transmission is not performed, the number of assigned CCs in downlink is two or more, and the techniques of the LTE-A system are not applied, it is possible to apply the above-mentioned Methods 1, 2, 3, 5, 6 and 9. Among the Methods, for the purpose of suppressing increases in PAPR (expanding coverage), the Methods 5 and 6 (single-carrier transmission) are excellent. Further, from the viewpoint of reducing modifications from the LTE system as possible, the Methods 1, 2 and 3 are excellent.

Meanwhile, when uplink data transmission is performed, the number of assigned CCs in downlink is one and the techniques of the LTE-A system are applied, it is possible to apply the above-mentioned Methods 5, 7, 8 and 10. Among the Methods, for the purpose of suppressing increases in PAPR (expanding coverage), the Method 5 (single-carrier transmission) is excellent. Further, from the viewpoint of reducing modifications from the LTE system as possible, the Methods 5 and 10 are excellent. Meanwhile, when uplink data transmission is performed, the number of assigned CCs in downlink is one, and the techniques of the LTE-A system are not applied, since the information amount is the same as in LTE, the control information is transmitted using the conventional LTE format.

Further, when uplink data transmission is performed, the number of assigned CCs in downlink is two or more, and the techniques of the LTE-A system are applied (the feedback control information amount is the highest when uplink data transmission is not performed), it is possible to apply the above-mentioned Methods 5, 7, 8 and 10. Among the Methods, the Method 8 (method for enabling the transmission band to be varied adaptively as distinct from the PUCCH) is desirable for transmission of the feedback control information of large size. Meanwhile, when uplink data transmission is performed, the number of assigned CCs in downlink is two or more, and the techniques of the LTE-A system are not applied, it is possible to apply the above-mentioned Methods 5, 7, 8 and 10. Among the Methods, for the purpose of suppressing increases in PAPR (expanding coverage), the Method 5 (single-carrier transmission) is excellent. Further, from the viewpoint of reducing modifications from the LTE system as possible, the Methods 5 and 10 are excellent.

In addition, when uplink data transmission is performed and the feedback control information is extremely large, the radio base station apparatus may instruct the mobile terminal apparatus to transmit only the feedback control information (in other words, to use the Methods 1, 2, 3, 5, 6 and 9) without performing assignment for data transmission (not performing uplink data transmission or delaying transmission).

Meanwhile, the relationship between the number of bits of the feedback control signal and the transmission method corresponding to the number of bits may be beforehand determined between the radio base station apparatus and the mobile terminal apparatus. Alternately, by combining the number of bits of the feedback control signal and the presence or absence of uplink data transmission, the relationship between the combination and the transmission method may be determined.

The mobile terminal apparatus and radio communication method according to the invention will specifically be described below.

Embodiment 1

This Embodiment describes the case of identifying signals from a plurality of users using the cyclic shift of CAZAC code sequences and transmitting a CQI signal that is feedback control information when signal transmission is performed on the PUCCH.

When uplink control channel signals of a plurality of users are multiplexed on the PUCCH, in order for the radio base station apparatus to be able to divide the uplink control channel signals for each user, the uplink control channel signals are orthogonally multiplexed. As such an orthogonal multiplexing method, there is the orthogonal multiplexing method using the cyclic shift of CAZAC (Constant Amplitude Zero Auto Correlation) code sequences.

Figure 10:
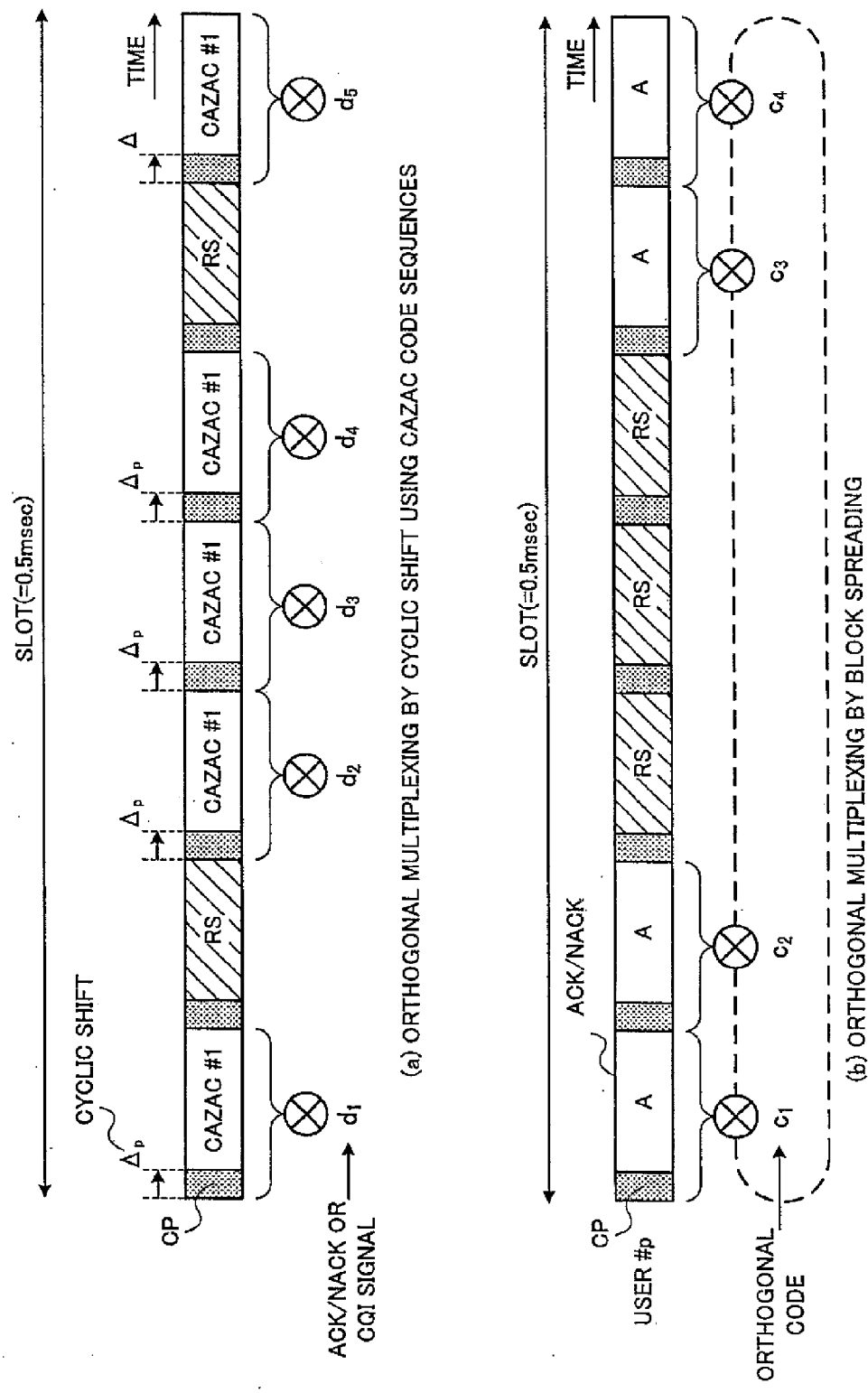
FIG. 10(a) is a diagram to explain orthogonal multiplexing by cyclic shift using CAZAC code sequences.
FIG. 10(b) is a diagram to explain orthogonal multiplexing by block spreading.

The orthogonal multiplexing method using the cyclic shift of CAZAC code sequences is an orthogonal multiplexing method employing the fact that sequence CAZAC#1($\Delta p$) obtained by cyclically shifting a CAZAC code sequence with code length L by $\Delta p$ is mutually orthogonal to sequence CAZAC#1($\Delta q$) obtained by cyclically shifting the CAZAC code sequence by $\Delta q$. Accordingly, in this method, with respect to SC-FDMA symbols to which CAZAC code sequences provided with varied cyclic shift amounts are mapped, by modulating the entire single SC-FDMA symbol (block modulation) with the control information, uplink control channel signals are orthogonally multiplexed for each user. For example, as shown in FIG. 10($a$), the CAZAC code sequence with a particular cyclic shift amount ($\Delta$) is mapped to each SC-FDMA symbol in a CQI subframe structure. Then, block modulation is performed using uplink control signals $d_1$ to $d_5$ subjected to data modulation. By assigning different cyclic shift amounts for each user, it is possible to actualize orthogonality among uplink control channel signals for each user. By this means, the radio base station apparatus is capable of dividing the uplink control signals for each user. In addition, the interval of the cyclic shift of the CAZAC code sequence assigned to the user is preferably set to be longer than the maximum delay amount of multipath.

Figure 11:
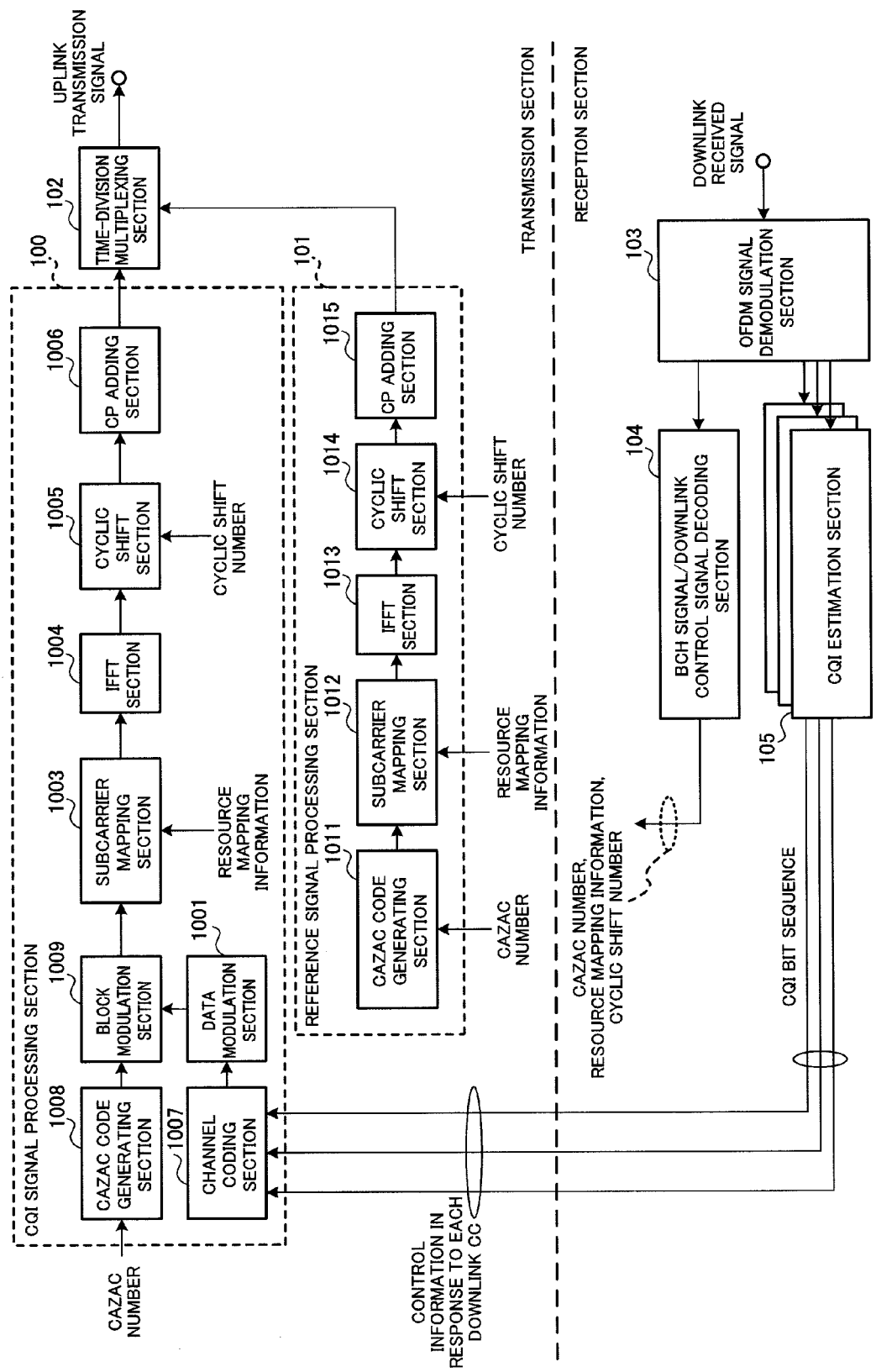
FIG. 11 is a diagram illustrating a schematic configuration of a mobile terminal apparatus according to Embodiment 1 of the invention.

FIG. 11 is a diagram illustrating a schematic configuration of a mobile terminal apparatus according to Embodiment 1 of the invention. The mobile terminal apparatus as shown in FIG. 11 is provided with a transmission section and a reception section. The transmission section is provided with a CQI signal processing section 100, reference signal processing section 101, and time-division multiplexing section 102 that time-division multiplexes the CQI signal and reference signal.

The CQI signal processing section 100 includes a channel coding section 1007 that performs error-correcting coding on CQI bit sequences respectively obtained from reference signals of a plurality of CCs, a data modulation section 1001 that performs data modulation on the coded signal, a CAZAC code generating section 1008 that generates a CAZAC code sequence associated with the CAZAC number, a block modulation section 1009 that modulates the generated CAZAC code sequence with the data-modulated signal, a subcarrier mapping section 1003 that performs mapping of the block-modulated signal to subcarriers, an IFFT (Inverse Fast Fourier Transform) section 1004 that performs IFFT on the mapped signal, a cyclic shift section 1005 that cyclically shifts the IFFT-processed signal, and a CP (Cyclic Prefix) adding section 1006 that adds a CP to the cyclically-shifted signal.

The reference signal processing section 101 has a CAZAC code generating section 1011 that generates a CAZAC code sequence associated with the CAZAC number, a subcarrier mapping section 1012 that performs mapping of a reference signal comprised of the CAZAC code sequence to subcarriers, an IFFT section 1013 that performs IFFT on the mapped signal, a cyclic shift section 1014 that cyclically shifts the IFFT-processed signal, and a CP adding section 1015 that adds a CP to the cyclically-shifted signal.

Downlink signals are transmitted in a wideband comprised of a plurality of CCs. In this case, a downlink signal including a reference signal is transmitted in each CC, and the mobile terminal apparatus receives the reference signal of each CC. Then, a CQI estimation section 105, described later, estimates channel quality in each CC using the reference signal of each CC, and generates a CQI bit sequence corresponding to the quality. The channel coding section 1007 of the CQI signal processing section 100 performs error-correcting coding on the CQI bit sequence. The channel coding section 1007 outputs the channel-coded signal to the data modulation section 1001. The data modulation section 1001 modulates the coded bit sequence to a signal of polar coordinate component. The data modulation section 1001 outputs the data-modulated signal to the block modulation section 1009. The CAZAC code generating section 1008 prepares a CAZAC code associated with the CAZAC number assigned to the user. The CAZAC code generating section 1008 outputs the generated CAZAC code sequence to the block modulation section 1009. The block modulation section 1009 block-modulates the CAZAC code sequence with the data-modulated control signal on a basis of a block corresponding to 1 SC-FDMA. The block modulation section 1009 outputs the block-modulated signal to the subcarrier mapping section 1003.

The subcarrier mapping section 1003 performs mapping of the block-modulated signal to subcarriers based on the resource mapping information.

The subcarrier mapping section 1003 outputs the signal that is mapped as described above to the IFFT section 1004. The IFFT section 1004 performs IFFT on the mapped signal and thereby transforms to a signal in the time domain. The IFFT section 1004 outputs the IFFT-processed signal to the cyclic shift section 1005.

The cyclic shift section 1005 cyclically shifts the signal in the time domain by a predetermined cyclic shift amount. In addition, the cyclic shift amount varies with each user, and is associated with the cyclic shift number. The cyclic shift section 1005 outputs the cyclically-shifted signal to the CP adding section 1005.

The CP adding section 1006 adds a CP to the cyclically-shifted signal. The CP adding section 1006 outputs the CP-added signal to the time-division multiplexing section 102.

The CAZAC code generating section 1011 of the reference signal processing section 101 prepares a CAZAC code associated with the CAZAC number assigned to the user to use as a reference signal. The CAZAC code generating section 1011 outputs the reference signal to the subcarrier mapping section 1012.

The subcarrier mapping section 1012 performs mapping of the signal in the frequency domain to subcarriers based on the resource mapping information. The subcarrier mapping section 1012 outputs the mapped reference signal to the IFFT section 1013. The IFFT section 1013 performs IFFT on the mapped signal and thereby transforms into a signal in the time domain. The IFFT section 1013 outputs the IFFT-processed reference signal to the cyclic shift section 1014.

The cyclic shift section 1014 cyclically shifts the reference signal in the time domain by a predetermined cyclic shift amount. In addition, the cyclic shift amount varies with each user, and is associated with the cyclic shift number. The cyclic shift section 1014 outputs the cyclically-shifted reference signal to the CP adding section 1015. The CP adding section 1015 adds a CP to the cyclically-shifted reference signal. The CP adding section 1015 outputs the CP-added reference signal to the time-division multiplexing section 102.

The time-division multiplexing section 102 time-division multiplexes the signal from the CQI signal processing section 100 and the reference signal from the reference signal processing section 101 to be a transmission signal including the uplink control channel signal.

The reception section includes an OFDM signal demodulation section 103 that demodulates an OFDM signal, a BCH (Broadcast Channel) signal/downlink control signal decoding section 104 that decodes a BCH signal and downlink control signal, and CQI estimation sections 105 that estimate the CQI using the reference signal included in the downlink signal.

The OFDM signal demodulation section 103 receives a downlink OFDM signal to demodulate. In other words, the section 103 removes the CP from the downlink OFDM signal, performs Fast Fourier Transform, extracts subcarriers assigned the BCH signal or downlink control signal, and performs data demodulation. The OFDM signal demodulation section 103 outputs the signal subjected to data demodulation to the BCH signal/downlink control signal decoding section 104. Further, the OFDM signal demodulation section 103 outputs the reference signal of each CC to the CQI estimation section 105 for each CC.

The BCH signal/downlink control signal decoding section 104 decodes the signal subjected to data demodulation, and obtains the CAZAC number, resource mapping information (including the resource block number), and the cyclic shift number. The BCH signal/downlink control signal decoding section 104 outputs the CAZAC number to the CAZAC code generating sections 1008 and 1011, outputs the resource mapping information to the subcarrier mapping sections 1003 and 1012, and outputs the cyclic shift number to the cyclic shift sections 1005 and 1014.

The CQI estimation section 105 estimates the CQI used in scheduling, adaptive radio link control (AMC:Adaptive Modulation and Coding) and the like in the radio base station apparatus, using the reference signal of each CC, and generates a CQI bit sequence. The CQI estimation section 105 outputs the CQI bit sequence of each CC to the channel coding section 1007.

Figure 12:
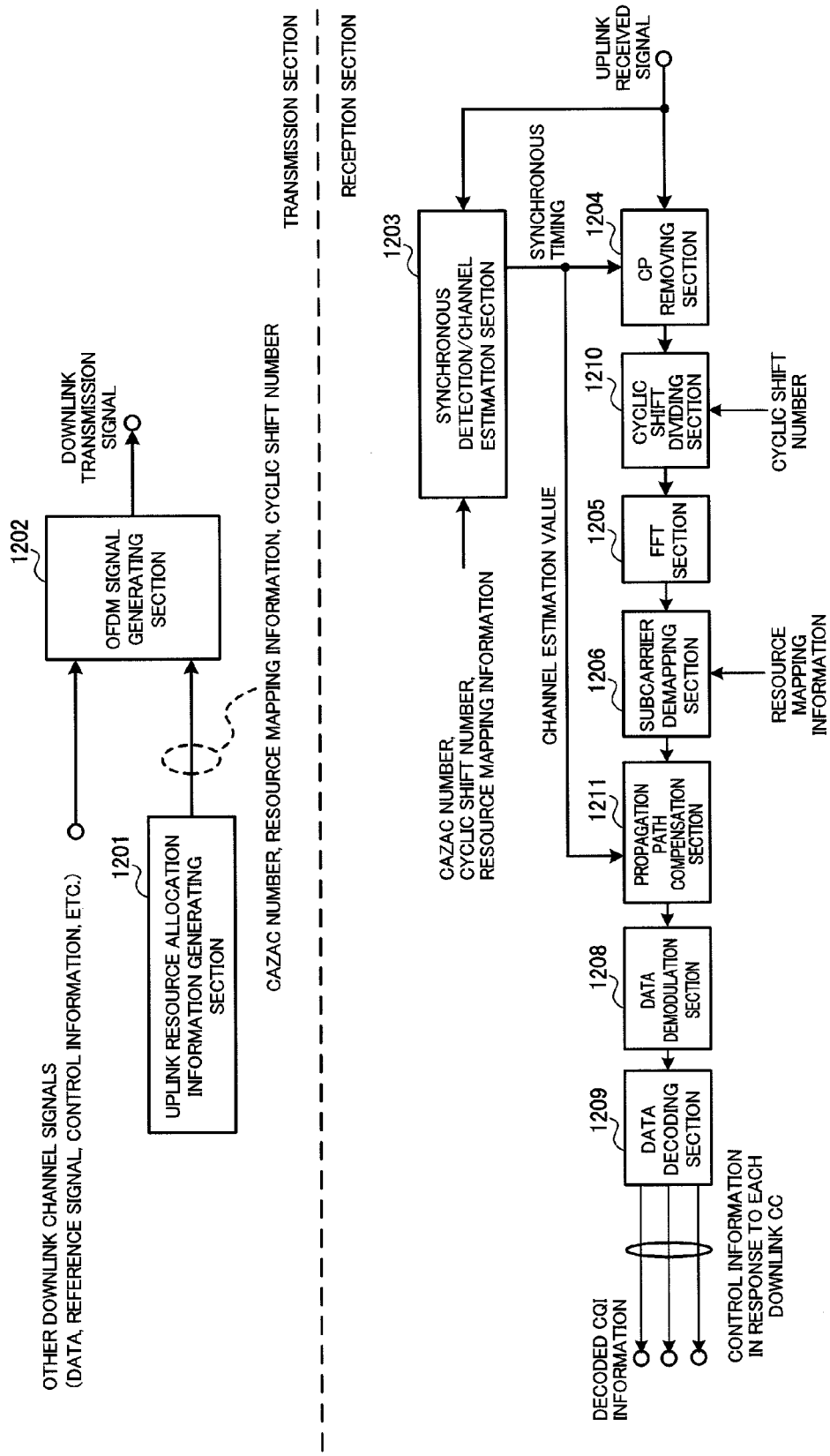
FIG. 12 is a diagram illustrating a schematic configuration of a radio base station apparatus according to Embodiment 1 of the invention.

FIG. 12 is a diagram illustrating a schematic configuration of the radio base station apparatus according to Embodiment 1 of the invention. The radio base station apparatus as shown in FIG. 12 is provided with a transmission section and a reception section. The transmission section has an uplink resource allocation information generating section 1201, and an OFDM signal generating section 1202 that multiplexes other downlink channel signals and uplink resource allocation information signal to generate an OFDM signal. The other downlink channel signals include data, reference signal, control signal, etc. and the uplink resource allocation information signal includes the CAZAC number, resource mapping information and the cyclic shift number.

In addition, the CAZAC number, resource mapping information and the cyclic shift number may be transmitted to the mobile terminal apparatus on the BCH, or may be transmitted to the mobile terminal apparatus on the downlink control channel (PDCCH: Physical Downlink Control Channel). Alternately, the CAZAC number, resource mapping information and the cyclic shift number may be notified to the mobile terminal apparatus by an upper layer.

The OFDM signal generating section 1202 performs mapping of the downlink signal including the other downlink channel signals and uplink resource allocation information signal to subcarriers, performs Inverse Fast Fourier Transform (IFFT), adds a CP, and thereby generates a downlink transmission signal.

The reception section has a CP removing section 1204 that removes the CP from a reception section, a cyclic shift dividing section 1210 that cancels the cyclic shift to divide into a signal of a targeted user, an FFT section 1205 that performs Fast Fourier Transform (FFT) on the received signal subjected to user division, a subcarrier demapping section 1206 that performs demapping of the FFT-processed signal, a propagation path compensation section 1211 that performs compensation for the propagation path on the mapped signal, a data demodulation section 1208 that performs data demodulation on the signal subjected to the propagation path compensation, a data decoding section 1209 that performs data decoding on the signal subjected to data demodulation, and a synchronous detection/channel estimation section 1203 that performs synchronous detection and channel estimation using the reference signal.

The CP removing section 1204 removes a portion corresponding to the CP from the received signal and extracts an effective signal portion, using an estimation value of reception timing estimated in the synchronous detection/channel estimation section 1203, described later. The CP removing section 1204 outputs the CP-removed signal to the cyclic shift dividing section 1210. The cyclic shift dividing section 1210 divides the control signals subjected to orthogonal multiplexing using the cyclic shift, using the cyclic shift number. The uplink control channel signal from the mobile terminal apparatus is cyclically shifted with a different cyclic shift amount for each user. Accordingly, by cyclically shifting in the opposite direction by the same cyclic shift amount as the cyclic shift amount performed in the mobile terminal apparatus, it is possible to isolate the control signal of the user targeted for the receiving processing. The cyclic shift dividing section 1210 outputs the signal subjected to user division to the FFT section 1205. The FFT section 1205 performs FFT on the received signal to transform into a signal in the frequency domain. The FFT section 1205 outputs the FFT-processed signal to the subcarrier demapping section 1206.

The subcarrier demapping section 1206 extracts a CQI signal that is an uplink control channel signal from the signal in the frequency domain using the resource mapping information. The subcarrier demapping section 1206 outputs the extracted CQI signal to the propagation path compensation section 1211. The propagation path compensation section 1211 compensates the signal for the phase and amplitude provided in the propagation path, using channel estimation estimated in the synchronous detection/channel estimation section 1203, described later. The propagation path compensation section 1211 outputs the signal subjected to propagation path compensation to the data demodulation section 1208.

The data demodulation section 1008 performs data demodulation on the CQI signal to output to the data decoding section 1209. The data decoding section 1209 performs data decoding on the demodulated CQI signal to output as CQI information.

The synchronous detection/channel estimation section 1203 divides the reference signals subjected to orthogonal multiplexing using the cyclic shift, using the cyclic shift number. The synchronous detection/channel estimation section 1203 performs the cyclic shift in the opposite direction using a cyclic shift amount associated with the cyclic shift number. By this means, it is possible to isolate the signal (reference signal) of the user associated with the cyclic shift number. Further, the synchronous detection/channel estimation section 1203 extracts a received reference signal from the signal in the frequency domain using the resource mapping information. Then, by calculating correlation between the CAZAC code sequence associated with the CAZAC number and the received CAZAC code sequence, the section 1203 obtains reception timing and performs channel estimation. The synchronous detection/channel estimation section 1203 outputs the obtained synchronous timing and channel estimation value to the CP removing section 1204 and propagation path compensation section 1211.

Described is a radio communication method according to the invention using the radio base station apparatus and mobile terminal apparatus having the above-mentioned configurations. In the radio communication method according to the invention, the mobile terminal apparatus receives a reference signal for each of a plurality of CCs transmitted from the radio base station apparatus, estimates the channel quality from the reference signal, generates a CQI signal corresponding to the quality for each CC, performs data modulation on the CQI signal for each CC, performs mapping of the data-modulated CQI signal to appropriate radio resources, and transmits an uplink transmission signal mapped to the radio resources.

First, the OFDM signal generating section 1202 of the radio base station apparatus multiplexes the uplink resource allocation information including the CAZAC number, resource mapping information (including the resource block number) and the cyclic shift number, and the other downlink channel signals to be an OFDM signal, and the OFDM signal is transmitted as a downlink transmission signal. The mobile terminal apparatus receives the downlink OFDM signal in the OFDM signal demodulation section 103 to demodulate. Then, the BCH signal/downlink control signal decoding section 104 extracts the CAZAC number, resource mapping information and the cyclic shift number, outputs the CAZAC number to the CAZAC code generating sections 1008 and 1011, outputs the resource mapping information to the subcarrier mapping sections 1003 and 1012, and outputs the cyclic shift number to the cyclic shift sections 1005 and 1014.

The OFDM signal demodulation section 103 extracts reference signals for each CC included in the downlink received signal to output to the CQI estimation sections 105. The CQI estimation sections 105 perform CQI estimation using the reference signals for each CC, and obtain CQI bit sequences for each CC. The CQI bit sequences are subjected to error-correcting coding in the channel coding section 1007, subjected to data modulation in the data modulation section 1001, subjected to block modulation in the block modulation section 1009, and mapped in the subcarrier mapping section 1003 based on the resource mapping information. In addition, when M-ary data modulation such as 8 PSK and 16QAM is performed on the control information, the data modulation section 1001 performs M-ary data modulation on the control information.

The mapped CQI signal is transformed into a signal in the time domain by IFFT in the IFFT section 1004, and is subjected to the cyclic shift associated with the cyclic shift number in the cyclic shift section 1005. Next, the CP adding section 1006 adds a CP to the signal provided with the cyclic shift. When multi-code transmission is performed, the cyclic shift section 1005 performs different cyclic shifts, and code-division multiplexes the signals subjected to the different cyclic shifts.

Meanwhile, the reference signal processing section 101 uses the CAZAC code sequence as a reference signal. Subsequently, the reference signal is mapped based on the resource mapping information, is subjected to IFFT, and then, is subjected to the cyclic shift associated with the cyclic shift number, and the cyclically-shifted signal is provided with a CP.

Thus obtained CQI signal and reference signal are time-division multiplexed in the format as shown in FIG. 2(a), and transmitted to the radio base station apparatus as an uplink transmission signal. The radio base station apparatus receives the uplink control channel signal that is orthogonally multiplexed among users, and removes the CP from the received signal in the CP removing section 1204. Next, the cyclic shift dividing section 1210 isolates the signal for each user based on the cyclic shift number assigned for each user. The FFT section 1205 performs FFT on the signal subjected to user division to be a signal in the frequency domain, the subcarrier demapping section 1206 performs demapping from the subcarriers based on the resource mapping information, and the propagation path compensation section 1211 compensates for channel variations provided in the propagation path.

Next, the data demodulation section 1208 performs data demodulation on the demapped signal, and then, the data decoding section 1209 decodes the signal to obtain the CQI information. The radio base station apparatus performs scheduling and adaptive radio link control using the obtained CQI information.

Thus, in this Embodiment, the apparatus performs mapping of the CQI signal that is the feedback control information for each CC in the optimal format and transmits the PUCCH signal, and it is thereby possible to efficiently transmit also the feedback control information with a large information amount. Further, this Embodiment is similarly applicable in the case of transmitting control information that increases in applying the techniques of the LTE-A system (coordinated multi-point transmission/reception techniques, MIMO techniques using more transmitting/receiving antennas than in LTE, etc.).

Embodiment 2

This Embodiment describes the case of identifying signals from a plurality of users using the cyclic shift and block spreading, and transmitting an ACK/NACK signal that is the feedback control information, when transmission is performed on the PUCCH.

When uplink control channel signals of a plurality of users are multiplexed on the PUCCH, in order for the radio base station apparatus to be able to divide the uplink control channel signals for each user, the uplink control channel signals are orthogonally multiplexed. As such an orthogonal multiplexing method, there are the orthogonal multiplexing method using the cyclic shift of CAZAC code sequences and another orthogonal multiplexing method using block spreading.

The principles of the orthogonal multiplexing method using the cyclic shift of CAZAC code sequences are the same as in FIG. 10(a) in Embodiment 1, and specific descriptions thereof are omitted.

Block spreading is an orthogonal multiplexing method for applying orthogonal codes in the time domain. For example, as shown in FIG. 10(b), a signal A in one SC-FDMA is replicated, and mapped to four SC-FDMA symbols (first symbol, second symbol, sixth symbol and seventh symbol). Further, the entire SC-FDMA symbol (first symbol, second symbol, sixth symbol and seventh symbol) are multiplied by spreading codes $c_1$ to $c_4$. By using spreading codes that are orthogonal among different users, it is possible to actualize orthogonality among uplink control channel signals for each user, and the radio base station apparatus is capable of dividing the uplink control channel signals for each user. In addition, in the case of transmitting a signal with the low number of information bits such as ACK/NACK, it is possible to use both the orthogonal multiplexing method using the cyclic shift of CAZAC code sequences and the orthogonal multiplexing method using block spreading, and since two different orthogonal methods are used, there is an advantage that it is possible to increase the number of users capable of being orthogonalized.

Figure 13:
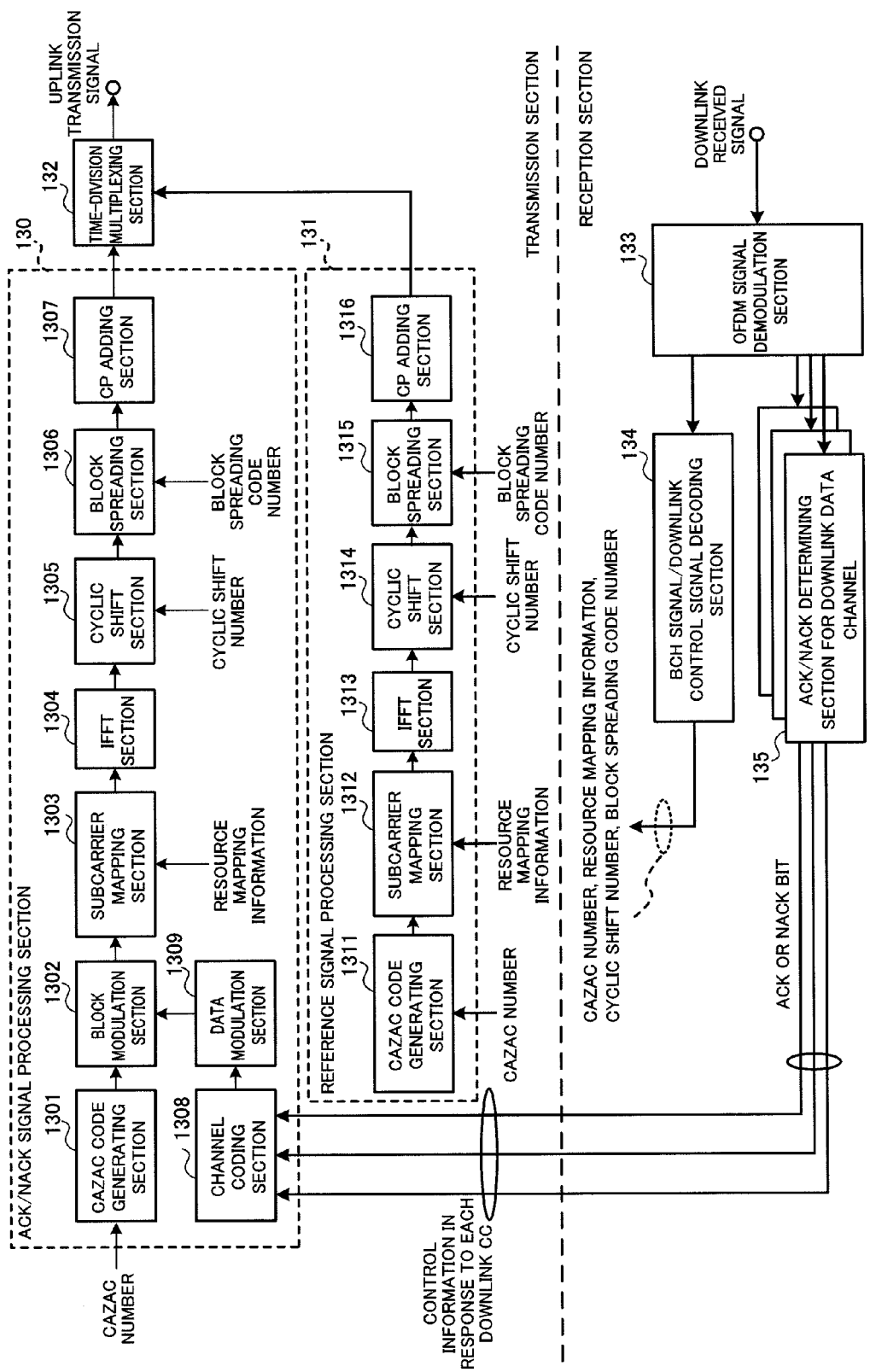
FIG. 13 is a diagram illustrating a schematic configuration of a mobile terminal apparatus according to Embodiment 2 of the invention.

FIG. 13 is a diagram illustrating a schematic configuration of a mobile terminal apparatus according to Embodiment 2 of the invention. The mobile terminal apparatus as shown in FIG. 13 is provided with a transmission section and a reception section. The transmission section is provided with an ACK/NACK signal processing section 130, reference signal processing section 131, and time-division multiplexing section 132 that time-division multiplexes the ACK/NACK signal and reference signal.

The ACK/NACK signal processing section 130 has a channel coding section 1308 that performs error-correcting coding on ACK/NACK bits obtained respectively in response to downlink data signals from a plurality of CCs, a data modulation section 1309 that performs data modulation on the coded signal, a CAZAC code generating section 1301 that generates a CAZAC code sequence associated with the CAZAC number, a block modulation section 1302 that performs block modulation using the generated CAZAC code sequence and the data-modulated signal, a subcarrier mapping section 1303 that performs mapping of the block-modulated signal to subcarriers, an IFFT section 1304 that performs IFFT on the mapped signal, a cyclic shift section 1305 that cyclically shifts the IFFT-processed signal, a block spreading section 1306 that performs block spreading on the cyclically-shifted signal, and a CP adding section 1307 that adds a CP to the signal subjected to block spreading. In addition, the channel coding section 1308, data modulation section 1309, CAZAC code generating section 1301, block modulation section 1302, subcarrier mapping section 1303, IFFT section 1304, cyclic shift section 1305, and CP adding section 1307 are respectively the same as the channel coding section 107, data modulation section 1001, CAZAC code generating section 1008, block modulation section 1009, subcarrier mapping section 1003, IFFT section 1004, cyclic shift section 1005, and CP adding section 1006 in Embodiment 1, and specific descriptions thereof are omitted.

The reference signal processing section 131 has a CAZAC code generating section 1311 that generates a CAZAC code sequence associated with the CAZAC number, a subcarrier mapping section 1312 that performs mapping of a reference signal comprised of the CAZAC code sequence to subcarriers, an IFFT section 1313 that performs IFFT on the mapped signal, a cyclic shift section 1314 that cyclically shifts the IFFT-processed signal, a block spreading section 1315 that performs block spreading on the cyclically-shifted signal, and a CP adding section 1316 that adds a CP to the signal subjected to block spreading. In addition, the CAZAC code generating section 1311, subcarrier mapping section 1312, IFFT section 1313, cyclic shift section 1314 and CP adding section 1316 are respectively the same as the CAZAC code generating section 1011, subcarrier mapping section 1012, IFFT section 1013, cyclic shift section 1014, and CP adding section 1015 in Embodiment 1, and specific descriptions thereof are omitted.

The block spreading sections 1306 and 1315 multiply the signals in the time domain by block spreading codes. In addition, the block spreading code varies for each user, and is associated with the block spreading code number. The block spreading sections 1306 and 1315 output the spread-modulated signals to the CP adding sections 1307 and 1316, respectively.

The reception section has an OFDM signal demodulation section 133 that demodulates an OFDM signal, a BCH signal/downlink control signal decoding section 134 that decodes a BCH signal and downlink control signal, and ACK/NACK determining sections 135 that determine whether or not a downlink shared data channel signal (PDSCH (Physical Downlink Shared Channel)) is received without error. In addition, the OFDM signal demodulation section 133 and BCH signal/downlink control signal decoding section 134 are respectively the same as the OFDM signal demodulation section 103 and BCH signal/downlink control signal decoding section 104 in Embodiment 1, and specific descriptions thereof are omitted.

The ACK/NACK determining section 115 determines whether or not the received downlink shared data channel signal (PDSCH signal) is received without error, and outputs a determination result. The determination result is expressed by transmittal confirmation information represented by acknowledgment (ACK bit) or negative acknowledgement (NACK bit). The determining section 135 outputs an ACK/NACK bit to the channel coding section 116 for each CC to the channel coding section 1308.

The BCH signal/downlink control signal decoding section 134 decodes the signal subjected to data demodulation, and obtains the CAZAC number, resource mapping information (including the number of CCs and the resource block number), the cyclic shift number, and the block spreading code number. The BCH signal/downlink control signal decoding section 134 outputs the CAZAC number to the CAZAC code generating sections 1301 and 1311, outputs the resource mapping information to the subcarrier mapping sections 1303 and 1312, outputs the cyclic shift number to the cyclic shift sections 1305 and 1314, and outputs the block spreading code number to the block spreading sections 1306 and 1315.

Figure 14:
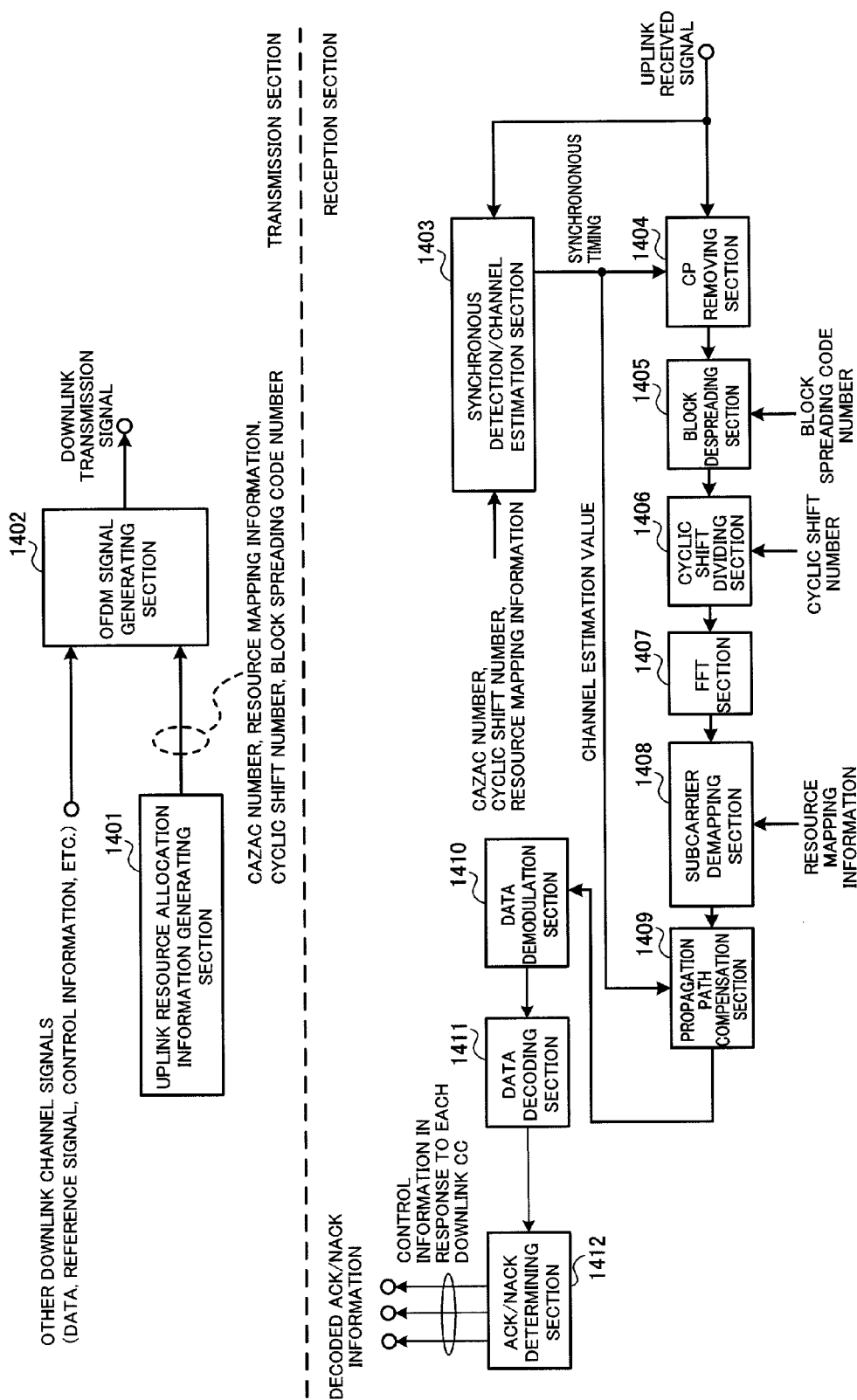
FIG. 14 is a diagram illustrating a schematic configuration of a radio base station apparatus according to Embodiment 2 of the invention.

FIG. 14 is a diagram illustrating a schematic configuration of the radio base station apparatus according to Embodiment 2 of the invention. The radio base station apparatus as shown in FIG. 14 is provided with a transmission section and a reception section. The transmission section has an uplink resource allocation information generating section 1401, and an OFDM signal generating section 1402 that multiplexes other downlink channel signals and uplink resource allocation information signal to generate an OFDM signal. The other downlink channel signals include data, reference signal, control signal, etc. and the uplink resource allocation information signal includes the CAZAC number, resource mapping information, the cyclic shift number and the block spreading code number. In addition, the uplink resource allocation information generating section 1401 and OFDM signal generating section 1402 are respectively the same as the uplink resource allocation information generating section 1201 and OFDM signal generating section 1202 in Embodiment 1, and specific descriptions thereof are omitted.

In addition, the CAZAC number, resource mapping information, the cyclic shift number and the block spreading code number may be transmitted to the mobile terminal apparatus on the BCH, or may be transmitted to the mobile terminal apparatus on the PDCCH. Alternately, the CAZAC number, resource mapping information, the cyclic shift number and the block spreading code number may be notified to the mobile terminal apparatus by an upper layer.

The reception section has a CP removing section 1404 that removes the CP from a reception section, a block despreading section 1405 that despreads the orthogonally multiplexed received signal with a spreading code associated with the block spreading code number, a cyclic shift dividing section 1406 that divides signals of targeted users using the cyclic shift numbers, an FFT section 1407 that performs FFT on the signal subjected to cyclic shift division, a subcarrier demapping section 1408 that performs demapping of the FFT-processed signal, a propagation path compensation section 1409 that performs compensation for the propagation path on the demapped signal, a data demodulation section 1410 that performs data demodulation on the signal subjected to propagation path compensation, a data decoding section 1411 that decodes the signal subjected to data demodulation, ACK/NACK determining sections 1412 that make an ACK/NACK determination using the decoded received signal for each CC, and a synchronous detection/channel estimation section 1403 that performs synchronous detection and channel estimation using the reference signal. In addition, the synchronous detection/channel estimation section 1403, CP removing section 1404, cyclic shift dividing section 1406, FFT section 1407, subcarrier demapping section 1408, propagation path compensation section 1409, data demodulation section 1410 and data decoding section 1411 are respectively the same as the synchronous detection/channel estimation section 1203, CP removing section 1204, cyclic shift dividing section 1210, FFT section 1205, subcarrier demapping section 1206, propagation path compensation section 1211, data demodulation section 1208 and data decoding section 1209 in Embodiment 1, and specific descriptions thereof are omitted.

The block despreading section 1405 divides, by using the block spreading code number, the received signal that is orthogonally multiplexed by using the block spreading code. The PUCCH signal from the mobile terminal apparatus is spread-modulated with the block spreading code varying for each user. Accordingly, by despreading using the same block spreading code as the block spreading code used in spreading in the mobile terminal apparatus, it is possible to obtain the uplink control channel signal without being spread. In addition, the block spreading code varies for each user, and is associated with the block spreading code number. Therefore, the block despreading section 1405 performs despreading using the block spreading code associated with the block spreading code number. By this means, it is possible to isolate the signal (PUCCH signal) of the user associated with the block spreading number. The block despreading section 1405 outputs the isolated signal to the cyclic shift dividing section 1406.

The cyclic shift dividing section 1406 divides, by using the cyclic shift number, the received signal that is orthogonally multiplexed by using the cyclic shift. The PUCCH signal from the mobile terminal apparatus is provided with the cyclic shift with a different cyclic shift amount for each user. In a strict sense, a combination of the block spreading code number and the cyclic shift number varies for each user. Accordingly, by performing the receiving processing using the block spreading code used in spreading in the mobile terminal apparatus and the cyclic shift amount, it is possible to divide the uplink control channel signal.

The ACK/NACK determining section 1412 determines whether the received control signal is acknowledgement (ACK bit) or negative acknowledgement (NACK bit), and outputs a determination result. The ACK/NACK determining section 1412 outputs an ACK/NACK bit for each CC. The ACK/NACK bit is sent to a retransmission control processing section (not shown).

Described is a radio communication method according to the invention using the radio base station apparatus and mobile terminal apparatus having the above-mentioned configurations. In the radio communication method according to the invention, the mobile terminal apparatus receives a PDSCH signal for each of a plurality of CCs from the radio base station apparatus, generates an ACK/NACK signal from the PDSCH signal for each CC, performs mapping of the ACK/NACK signal for each CC to appropriate radio resources, and transmits an uplink transmission signal mapped to the radio resources.

First, the OFDM signal generating section 1402 in the radio base station apparatus multiplexes the uplink resource allocation information including the CAZAC number, resource mapping information (including the resource block number), the cyclic shift number and the block spreading code number, and the other downlink channel signals to be an OFDM signal, and the OFDM signal is transmitted as a downlink transmission signal. The mobile terminal apparatus receives the downlink OFDM signal in the OFDM signal demodulation section 133 to demodulate. Then, the BCH signal/downlink control signal decoding section 134 extracts the CAZAC number, resource mapping information, the cyclic shift number and the block spreading code number, outputs the CAZAC number to the CAZAC code generating sections 1301 and 1311, outputs the resource mapping information to the subcarrier mapping sections 1303 and 1312, outputs the cyclic shift number to the cyclic shift sections 1305 and 1314, and outputs the block spreading code number to the block spreading sections 1306 and 1315.

The OFDM signal demodulation section 133 extracts the PDSCHs for each CC included in the downlink received signal to output to the ACK/NACK determining sections 135. The ACK/NACK determining sections 135 determine ACK/NACK using the PDSCH signals for each CC, and obtain ACK/NACK bit sequences for each CC. The ACK/NACK bit sequences are subjected to channel coding in the channel coding section 1308, subjected to data modulation in the data modulation section 1308, subjected to block modulation in the block modulation section 1309, and then, mapped in the subcarrier mapping section 1303 based on the resource mapping information.

The mapped ACK/NACK signal is transformed into a signal in the time domain by IFFT in the IFFT section 1304, and is subjected to the cyclic shift associated with the cyclic shift number in the cyclic shift section 1305. Next, the block spreading section 1306 performs block spreading on the cyclically-shifted signal using the block spreading code, and the CP adding section 1307 adds a CP to the resultant.

Meanwhile, the reference signal processing section 131 uses the CAZAC code sequence as a reference signal. Subsequently, the reference signal is mapped based on the resource mapping information, is subjected to IFFT, and then, is subjected to the cyclic shift associated with the cyclic shift number. Then, the signal is subjected to block spreading, and is provided with a CP.

Figure 1:
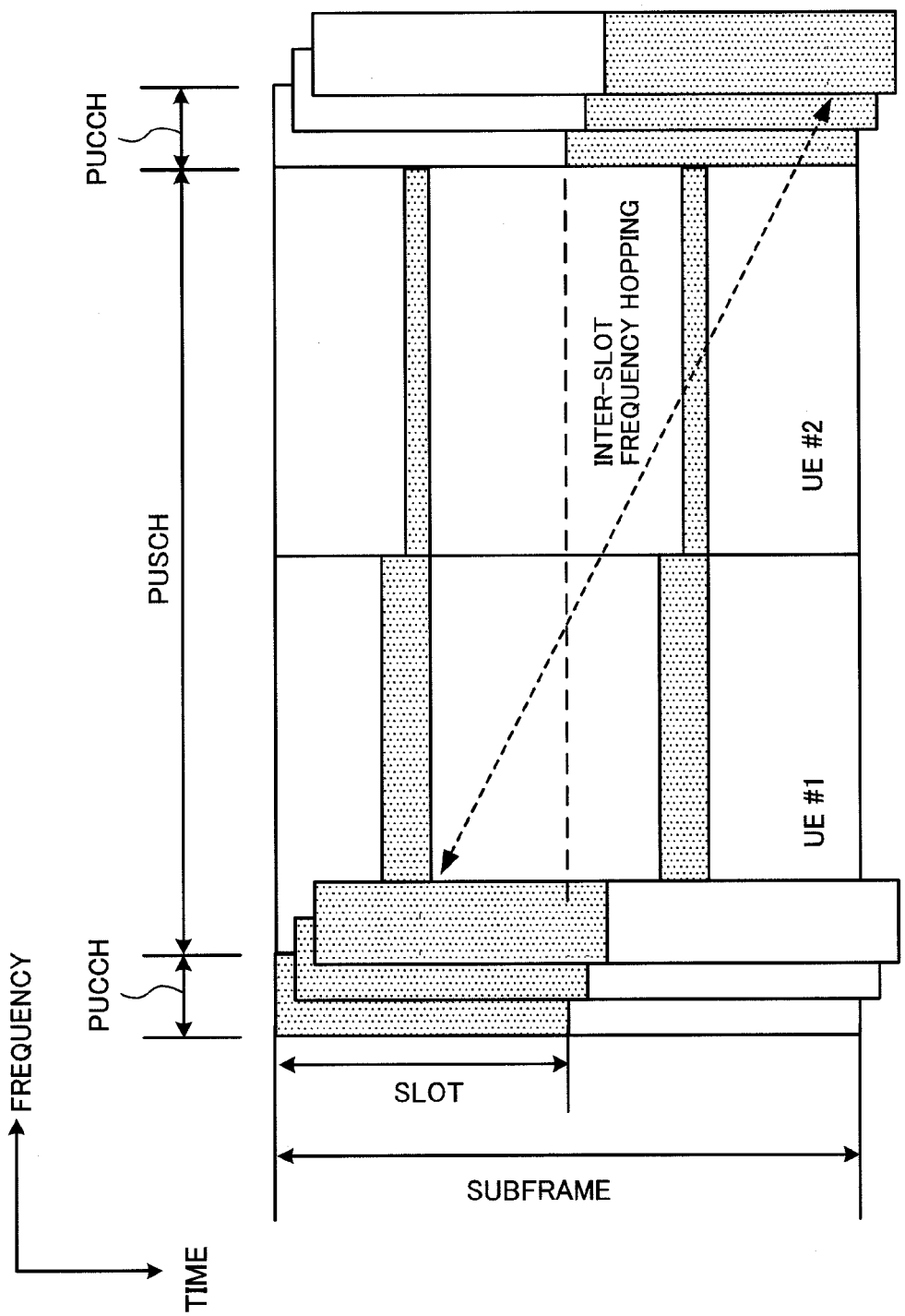
FIG. 1 is a diagram to explain channel structures to perform mapping uplink signals.
Figure 2:
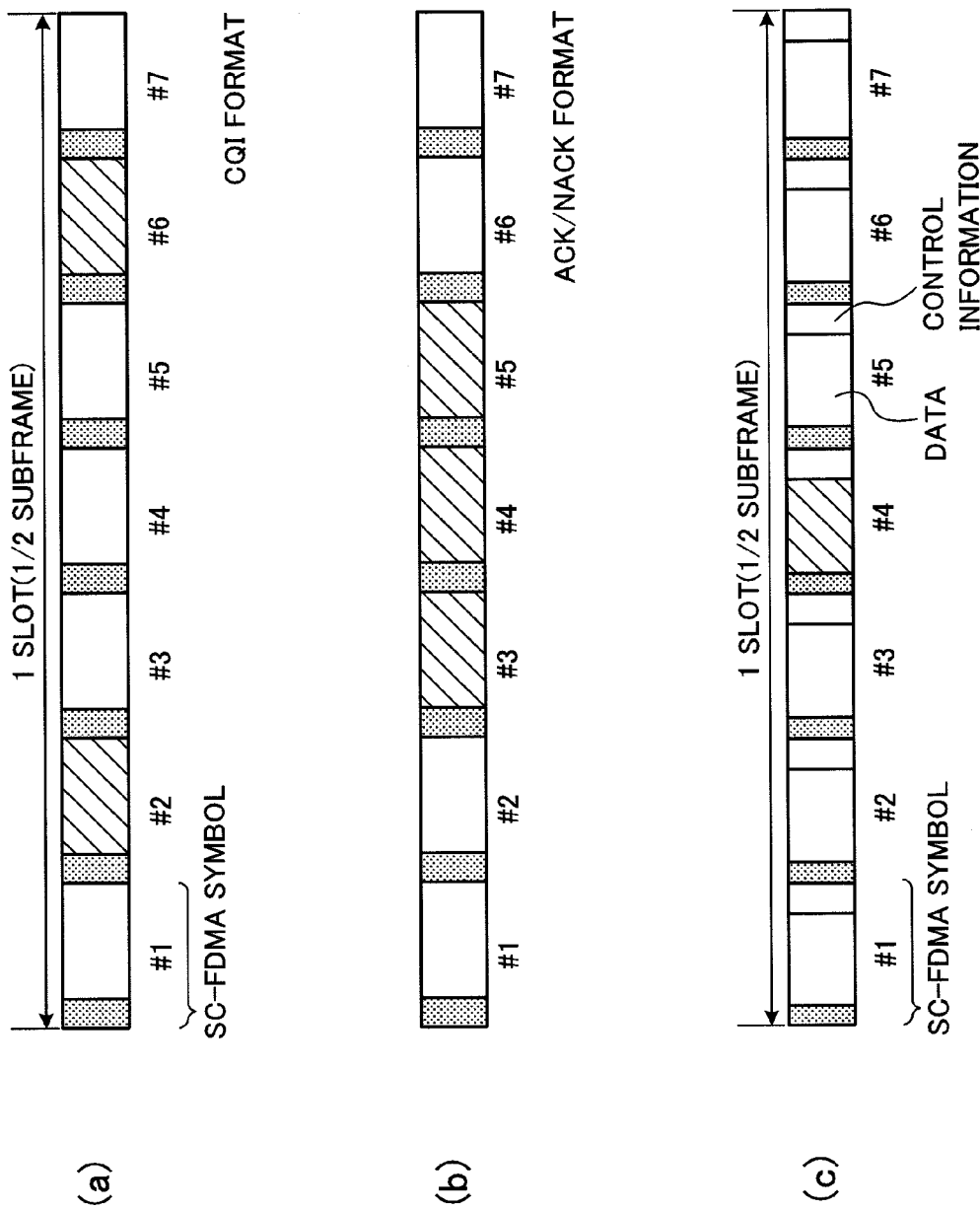
FIGS. 2(a) to 2(c) are diagrams illustrating uplink subframe structure.

Thus obtained ACK/NACK signal and reference signal are time-division multiplexed in the format as shown in FIG. 2(*b*), and transmitted to the radio base station apparatus as an uplink transmission signal. The radio base station apparatus receives the uplink control channel signal that is orthogonally multiplexed among users, and removes the CP from the received signal in the CP removing section 1404. Next, the block despreading section 1405 despreads the CP-removed signal with the block spreading code used in the mobile terminal apparatus. The cyclic shift dividing section 1406 cyclically shifts the despread signal in the opposite direction by the cyclic shift amount provided in the mobile terminal apparatus to divide into signals of respective users. Subsequently, the FFT section 1407 performs FFT on the signal divided for each user to be a signal in the frequency domain, the subcarrier demapping section 1408 performs demapping from the subcarriers based on the resource mapping section, and the propagation path compensation section 1409 compensates the signal for channel variations provided in the propagation path.

Next, the data demodulation section 1410 performs data demodulation on the demapped signal, and then, the decoding section 1411 performs data decoding on the resultant and obtains user data. The user data is output to the ACK/NACK determining sections 1412. The ACK/NACK determining sections 1412 output ACK/NACK bits. The ACK/NACK bits are sent to a retransmission control processing section (not shown).

Thus, in this Embodiment, the apparatus performs mapping of the ACK/NACK signal that is the feedback control information for each CC in the optimal format and transmits the PUCCH signal, and therefore, it is possible to efficiently transmit also the feedback control information with a large information amount.

Embodiment 3

This Embodiment describes the case in which feedback control signals are transmitted on the PUSCH.

When a control signal is concurrently transmitted at timing at which a data signal is transmitted, the data signal and the control signal are time-division multiplexed and transmitted on the PUSCH. Alternately, instead of time-division multiplexing, resource blocks for transmitting the data signal and resource blocks for transmitting the control signal are separated, frequency-division multiplexed, and transmitted. Further, even when the data signal is not transmitted, resource blocks to transmit the control signal are assigned to the PUSCH and transmitted.

Figure 15:
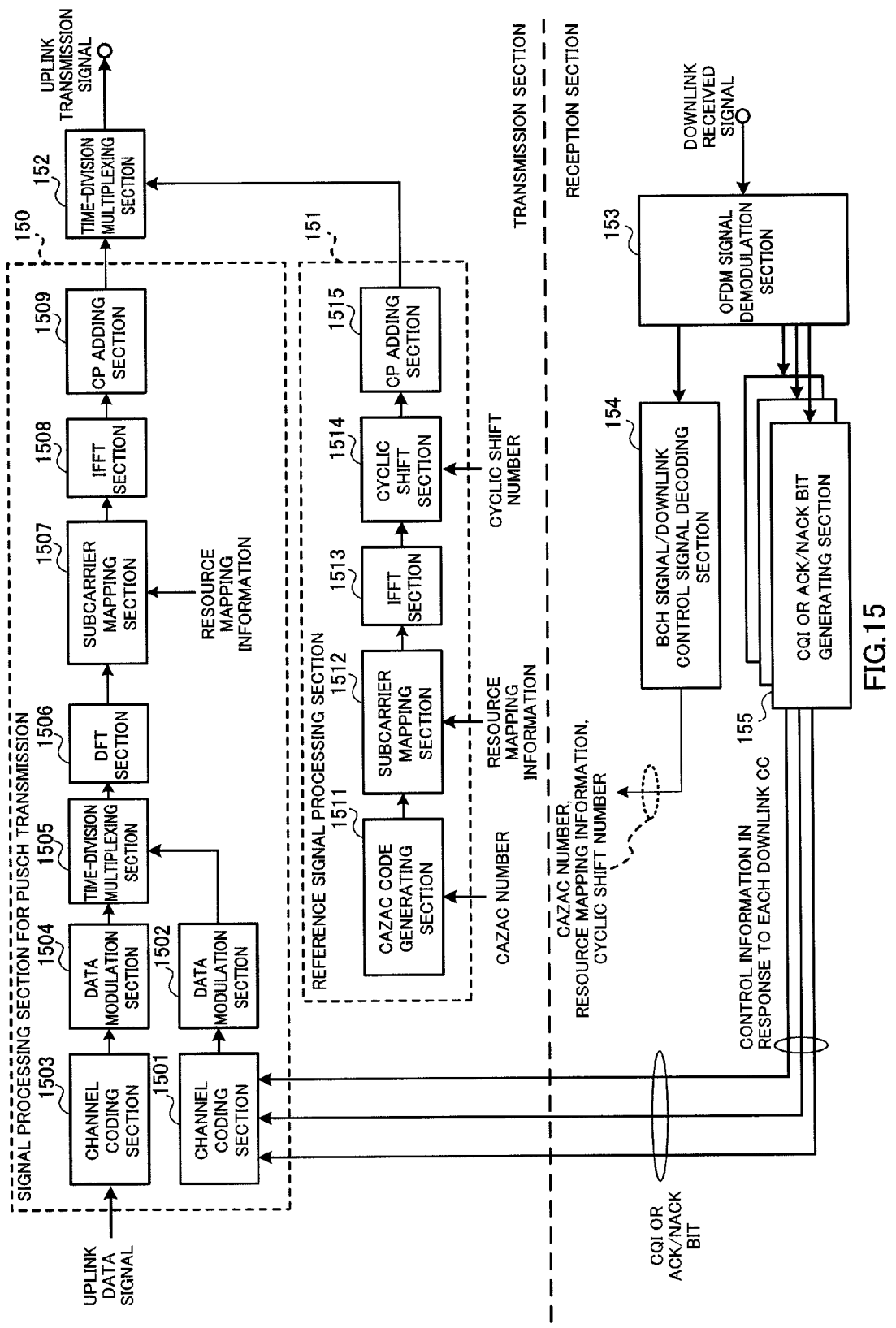
FIG. 15 is a diagram illustrating a schematic configuration of a mobile terminal apparatus according to Embodiment 3 of the invention.

FIG. 15 is a diagram illustrating a schematic configuration of a mobile terminal apparatus according to Embodiment 3 of the invention. The mobile terminal apparatus as shown in FIG. 15 is provided with a transmission section and a reception section. The transmission section is provided with a signal processing section 150 for PUSCH transmission, a reference signal processing section 151, and a time-division multiplexing section 152 that time-division multiplexes the signal to be transmitted on the PUSCH and reference signal.

The signal processing section 150 for PUSCH transmission has a channel coding section 1501 that performs error-correcting coding on CQI bit sequences respectively obtained from reference signals of a plurality of CCs or ACK/NACK bit sequences, a data modulation section 1502 that performs data modulation on the coded signal, a channel coding section 1503 that performs error-correcting coding on a data signal, a data modulation section 1504 that performs data modulation on the channel-coded signal, a time-division multiplexing section 1505 that time-division multiplexes the data signal and the control signal, a DFT section 1506 that transforms the multiplexed signal into a signal in the frequency domain, a subcarrier mapping section 1507 that performs mapping of the DFT-processed signal to subcarriers, an IFFT section 1508 that performs Inverse Fast Fourier Transform (IFFT) on the mapped signal, and a CP adding section 1509 that adds a CP to the IFFT-processed signal. In addition, the channel coding section 1501, data modulation section 1502, subcarrier mapping section 1507, IFFT section 1508, and CP adding section 1509 are respectively the same as the channel coding section 1007, data modulation section 1001, subcarrier mapping section 1003, IFFT section 1004 and CP adding section 1006 in Embodiment 1, and specific descriptions thereof are omitted.

The reference signal processing section 151 has a CAZAC code generating section 1511 that generates a CAZAC code sequence associated with the CAZAC number, a subcarrier mapping section 1512 that performs mapping of a reference signal comprised of the CAZAC code sequence to subcarriers, an IFFT section 1513 that performs IFFT on the mapped signal, a cyclic shift section 1514 that cyclically shifts the IFFT-processed signal, and a CP adding section 1515 that adds a CP to the cyclically-shifted signal. In addition, the CAZAC code generating section 1511, subcarrier mapping section 1512, IFFT section 1513, cyclic shift section 1514, and CP adding section 1515 are respectively the same as the CAZAC code generating section 1011, subcarrier mapping section 1012, IFFT section 1013, cyclic shift section 1014, and CP adding section 1015 in Embodiment 1, and specific descriptions thereof are omitted.

The reception section is provided with an OFDM signal demodulation section 153, BCH signal/downlink control signal decoding section 154, and CQI or ACK/NACK bit generating section 155. Downlink signals are transmitted in a wide band comprised of a plurality of CCs. In this case, a downlink signal including a reference signal is transmitted in each CC, and the mobile terminal apparatus receives the reference signal of each CC. Then, the CQI or ACK/NACK generating section 155 estimates channel quality in each CC using the reference signal of each CC, and generates a CQI bit sequence corresponding to the quality. Further, the section 155 makes a determination whether a downlink shared data channel signal (PDSCH) is received without error, and generates an ACK/NACK bit sequence corresponding to the determination.

The time-division multiplexing section 1505 time-division multiplexes the data-modulated data signal and the control signal. When the data signal and the control signal are frequency-division multiplexed, this processing is omitted. The time-division multiplexing section 1505 outputs the time-division multiplexed signal to the DFT section 1506.

The DFT section 1506 transforms the input signal in the time domain into a signal in the frequency domain. The DFT section 1506 outputs the signal in the frequency domain to the subcarrier mapping section 1507. The subcarrier mapping section 1507 performs mapping of the signal based on the resource mapping information. At this point, when the data signal and the control signal are frequency-division multiplexed, the subcarrier mapping section frequency-division multiplexes the signals.

The time-division multiplexing section 152 time-division multiplexes the signal from the signal processing section 150 for PUSCH transmission and the reference signal from the reference signal processing section 151 to be a transmission signal including the uplink control signal.

Figure 16:
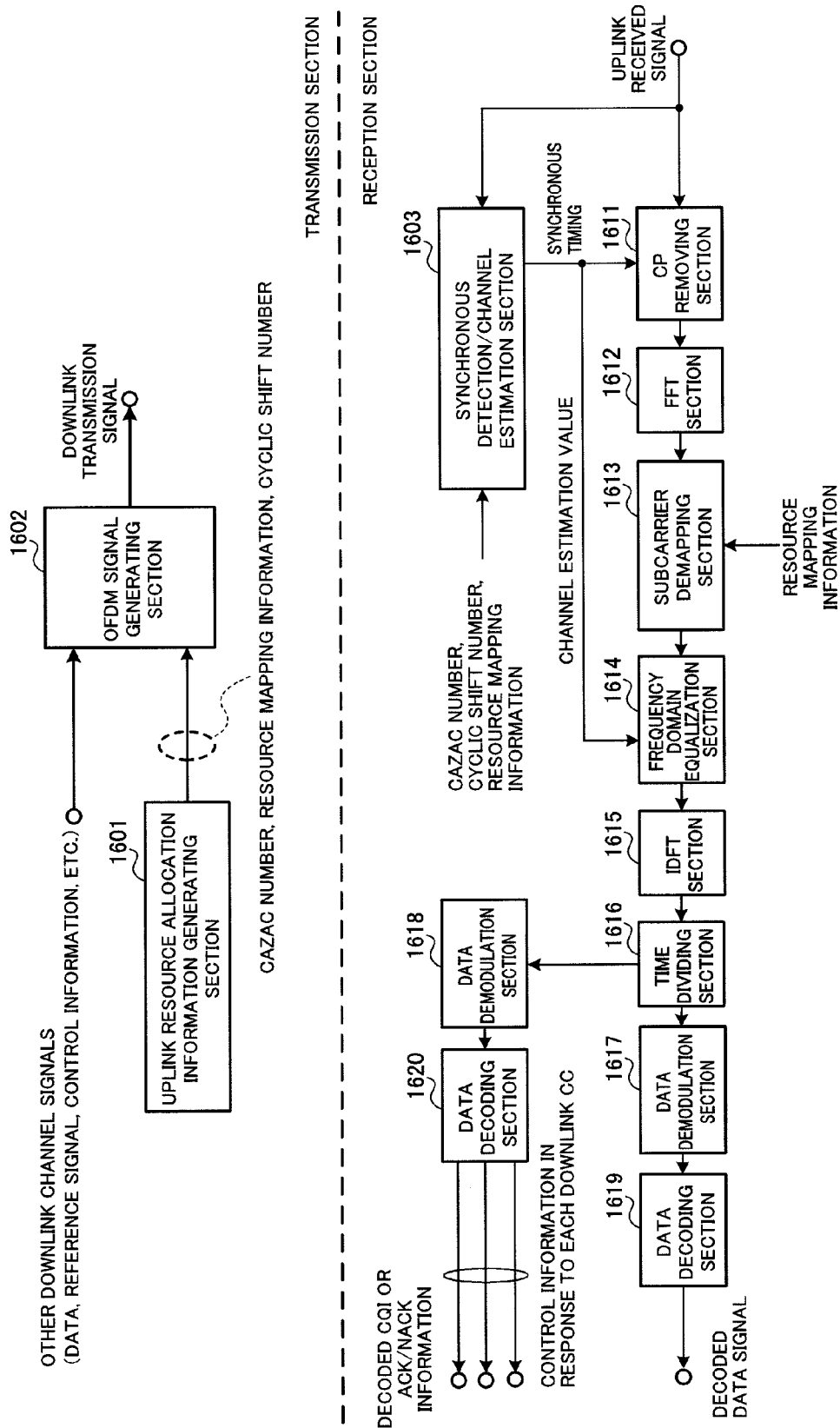
FIG. 16 is a diagram illustrating a schematic configuration of a radio base station apparatus according to Embodiment 3 of the invention.

FIG. 16 is a diagram illustrating a schematic configuration of the radio base station apparatus according to Embodiment 3 of the invention. The radio base station apparatus as shown in FIG. 16 is provided with a transmission section and a reception section. The transmission section has an uplink resource allocation information generating section 1601, and an OFDM signal generating section 1602 that multiplexes other downlink channel signals and uplink resource allocation information signal to generate an OFDM signal. The other downlink channel signals include data, reference signal, control signal, etc. and the uplink resource allocation information signal includes the CAZAC number, resource mapping information and the cyclic shift number. In addition, the uplink resource allocation information generating section 1601, and OFDM signal generating section 1602 are respectively the same as the uplink resource al location information generating section 1201, and OFDM signal generating section 1202 in Embodiment 1, and specific descriptions thereof are omitted.

In addition, the CAZAC number, resource mapping information and the cyclic shift number may be transmitted to the mobile terminal apparatus on the BCH, or may be transmitted to the mobile terminal apparatus on the downlink control channel (PDCCH). Alternately, the CAZAC number, resource mapping information and the cyclic shift number may be notified to the mobile terminal apparatus by an upper layer.

The reception section has a CP removing section 1611 that removes the CP from a reception section, an FFT section 1612 that performs Fast Fourier Transform (FFT) on the CP-removed received signal, a subcarrier demapping section 1613 that performs demapping of the FFT-processed signal, a frequency domain equalization section 1614 that reduces the effect of multipath interference provided in the propagation path on the demapped signal, an IDFT section 1615 that performs IDFT on the frequency-equalized signal, a time dividing section 1616 that divides the IDFT-processed signal in the time domain into a data signal and a control signal, data demodulation sections 1617 and 1618 that perform data demodulation on the divided data signal and control signal, data decoding sections 1619 and 1620 that perform data decoding on the data-demodulated signals, and a synchronous detection/channel estimation section 1603 that performs synchronous detection and channel estimation using the reference signal. In addition, the synchronous detection/channel estimation section 1603, CP removing section 1611, FFT section 1612, subcarrier demapping section 1613, data demodulation sections 1617 and 1618, and data decoding sections 1619 and 1620 are respectively the same as the synchronous detection/channel estimation section 1203, CP removing section 1204, FFT section 1205, subcarrier demapping section 1206, data demodulation section 1208, and data decoding section 1209 in Embodiment 1, and specific descriptions thereof are omitted.

The frequency domain equalization section 1614 reduces the effect of multipath interference provided in the propagation path, using channel estimation estimated in the synchronous detection/channel estimation section 1603. The frequency domain equalization section 1614 outputs the signal subjected to frequency equalization to the IDFT section 1615. The IDFT section 1615 transforms the frequency-equalized signal in the frequency domain to a signal in the time domain. The IDFT section 1615 outputs the transformed signal to the time dividing section 1616. The time dividing section 1616 divides the signal into the data signal and control signal. This processing is performed only when the data signal and control signal are time-division multiplexed. When the data signal and control signal are frequency-division multiplexed, the subcarrier mapping section 1613 is capable of dividing into the data signal and frequency signal. The time dividing section 1616 outputs the divided data signal to the data demodulation section 1617, and outputs the divided control signal to the data demodulation section 1618.

The synchronous detection/channel estimation section 1603 divides the reference signals subjected to orthogonal multiplexing using the cyclic shift, using the cyclic shift number. The synchronous detection/channel estimation section 1603 performs the cyclic shift in the opposite direction using a cyclic shift amount associated with the cyclic shift number. By this means, it is possible to isolate the signal (reference signal) of the user associated with the cyclic shift number. Further, the synchronous detection/channel estimation section 1603 extracts a received reference signal from the signal in the frequency domain using the resource mapping information. Then, by calculating correlation between the CAZAC code sequence associated with the CAZAC number and the received CAZAC code sequence, the section 1603 obtains reception timing and performs channel estimation. The synchronous detection/channel estimation section 1603 outputs the obtained synchronous timing and channel estimation value to the CP removing section 1611 and frequency domain equalization section 1614.

Described is a radio communication method according to the invention using the radio base station apparatus and mobile terminal apparatus having the above-mentioned configurations. In the radio communication method according to the invention, the mobile terminal apparatus receives a reference signal for each of a plurality of CCs transmitted from the radio base station apparatus, estimates the channel quality from the reference signal, generates a CQI signal corresponding to the quality for each CC, performs data modulation on the CQI signal for each CC, performs mapping of the data-modulated CQI signal to appropriate radio resources, and transmits an uplink transmission signal mapped to the radio resources. Further, in the radio communication method according to the invention, the mobile terminal apparatus receives a PDSCH signal for each of a plurality of CCs from the radio base station apparatus, generates an ACK/NACK signal in response to the PDSCH signal for each CC, performs mapping of the ACK/NACK signal for CC to appropriate radio resources, and transmits an uplink transmission signal mapped to the radio resources.

Further, the above-mentioned description describes the case of transmitting the data signal and the control signal at the same timing, and it is also possible to transmit only the control signal on the PUSCH. In this case, such transmission is actualized by not performing the processing of the part concerning transmission of the data signal in the above-mentioned description.

Furthermore, when the control signal and the data signal are frequency-division multiplexed, or only the control signal is transmitted, with respect to radio resources for transmitting the control signal, as described in Embodiment 1 or Embodiment 2, it is possible to orthogonally multiplex control signals from a plurality of users by the principles of cyclic shift multiplexing or block spreading multiplexing to transmit.

Thus, in this Embodiment, the apparatus performs mapping of the CQI signal or the ACK/NACK signal that is the feedback control information for each CC in the optimal format and transmits the PUCCH signal, and it is thereby possible to efficiently transmit also the feedback control information with a large information amount. Further, this Embodiment is similarly applicable in the case of transmitting control information that increases in applying the techniques of the LTE-A system (coordinated multi-point transmission/reception techniques, MIMO techniques using more transmitting/receiving antennas than in LTE, etc.).

Embodiment 4

In uplink of the LTE system, in order to simplify the transmission circuit and achieve low power consumption in the mobile terminal apparatus, single-stream transmission (single transmission amplifier) is applied. Meanwhile, in the LTE-A system that is the next-generation mobile communication system, in order to meet requirements for peak data rates higher than in the LTE system, it is determined to apply single user MIMO (SU-MIMO) up to quad-stream transmission (quad transmission amplifiers). In other words, the mobile terminal apparatus supporting the LTE-A system has the UE capability for transmitting different signals respectively from a plurality of antennas. In the case of applying such SU-MIMO, it is possible to transmit the feedback control information using a plurality of transmitting antennas. For example, it is possible to transmit the feedback control information for each downlink CC (downlink CC #1 CQI/PMI signal and downlink #2 CQI/PMI signal) respectively from different transmitting antennas, and to transmit different types of feedback control information (CQI/PMI signal and ACK/NACK signal) respectively from different transmitting antennas.

By adopting such transmission methods, it is possible to exhibit the following effects. In other words, (1) it is possible to transmit larger amounts of feedback control information. (2) It is possible to concurrently transmit more types of signals. (3) It is possible to avoid increases in PAPR (Peak-to-Average Power Ratio).

Figure 17:
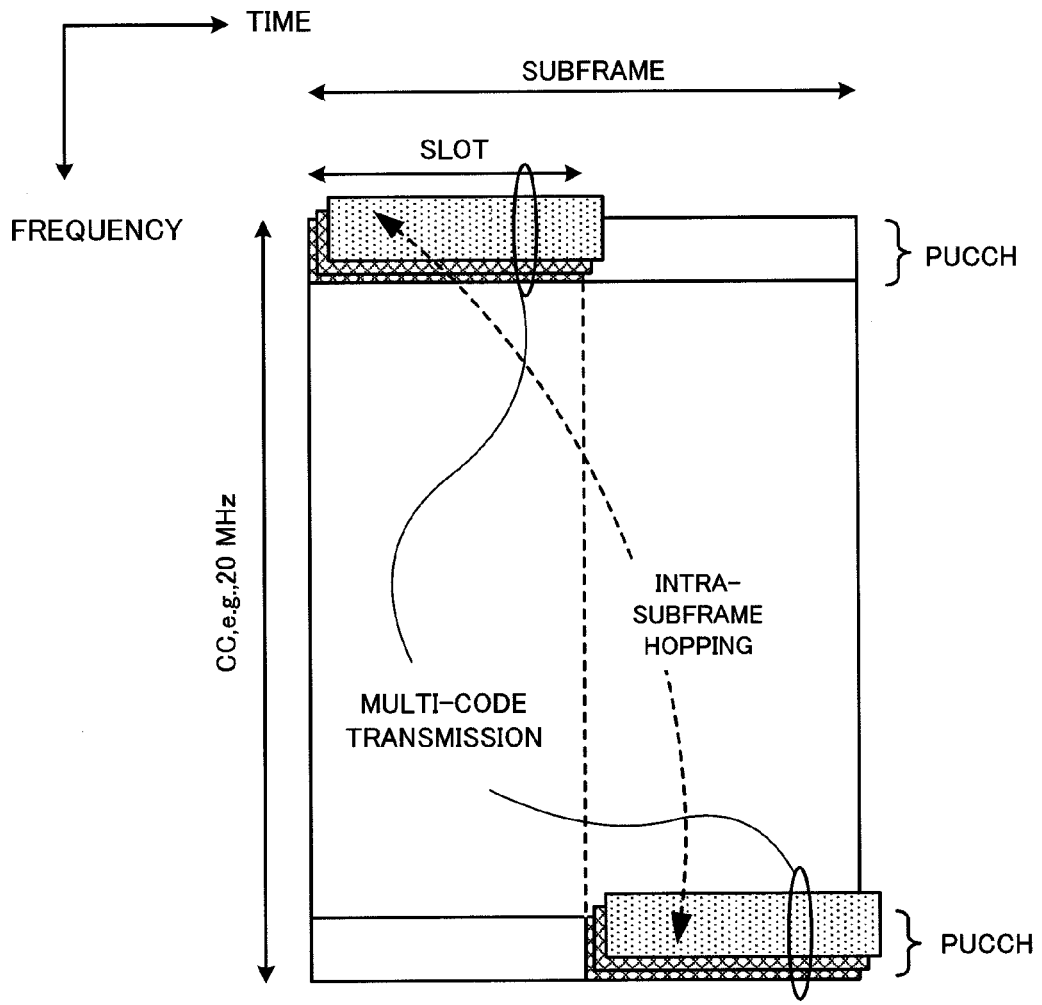
FIG. 17 is a diagram to explain a format to transmit uplink control information in a mobile terminal apparatus according to Embodiment 4 of the invention.

In this case, first, there is a method (multi-code transmission) of transmitting on the PUCCH using a plurality of radio resources. For example, as shown in FIG. 17, the feedback control information to be transmitted from a plurality of transmitting antennas, #1, #2, is orthogonally code-division multiplexed into one slot of the PUCCH (Method 11). In other words, as shown in FIG. 17, the feedback control information is orthogonally code-division multiplexed and mapped into radio resources (resource blocks) of the same frequency and time of the PUCCH and is subjected to multi-code transmission. Further, intra-subframe frequency hopping is adopted to obtain frequency diversity gain.

According to such a transmission method, as compared with the case of single-stream transmission, it is possible to transmit number-of-transmitting-antenna-times feedback control information. Further, since a signal per transmitting antenna is of single-carrier transmission, the PAPR does not increase (because of the same format as the PUCCH in the LTE system). In addition, to further increase the transmission amount of the feedback control information, M-ary data modulation (8 PSK, 16QAM, etc.) may be applied as in the above-mentioned Method 1.

Figure 18:
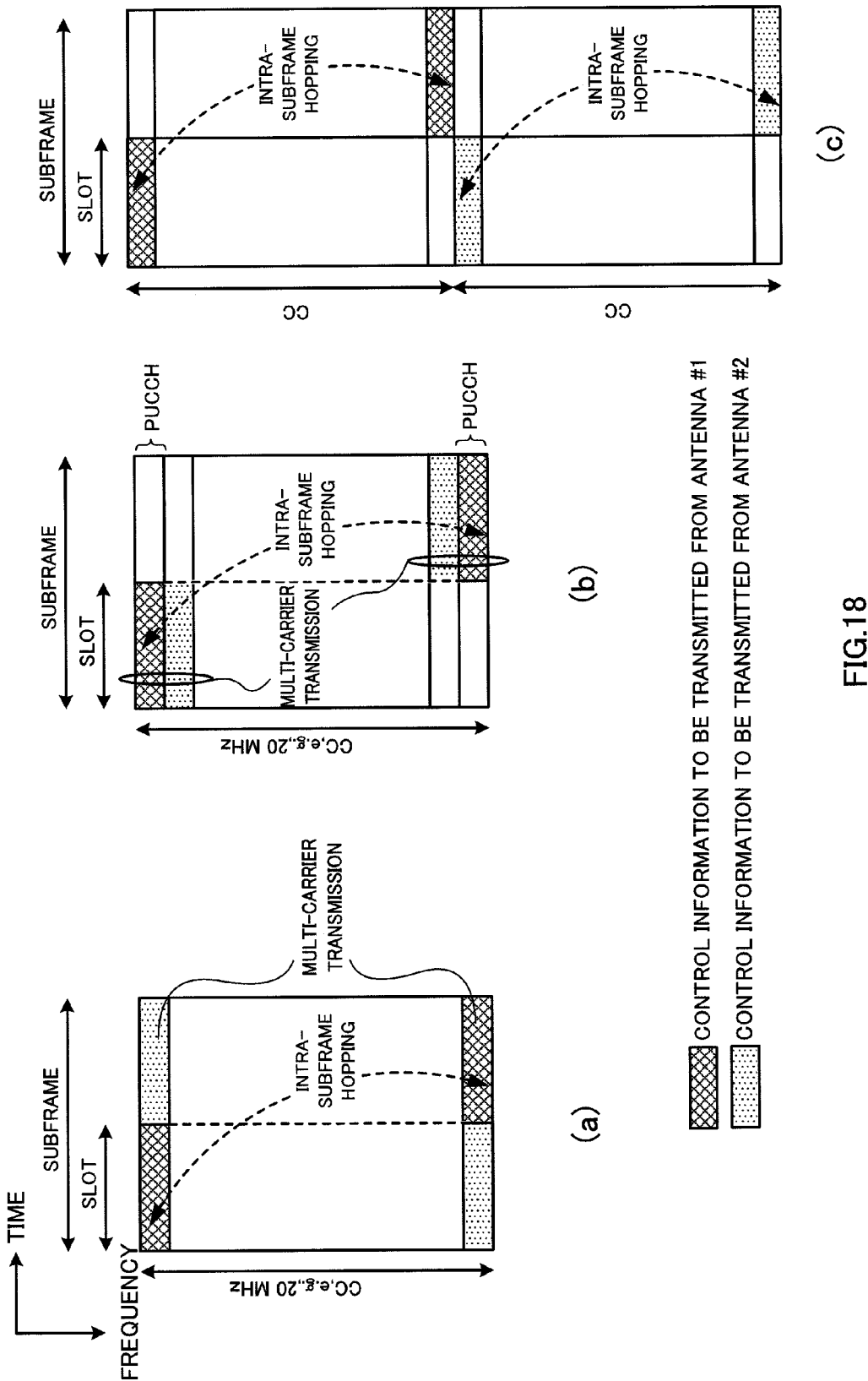
FIGS. 18(a) to 18(c) are other diagrams to explain the format to transmit the uplink control information in the mobile terminal apparatus according to Embodiment 4 of the invention.

Next, there is a method of transmitting on the PUCCH using a plurality of radio resources (multi-carrier transmission). For example, as shown in FIGS. 18(*a*) to 18(*c*), the feedback control information to be transmitted from a plurality of transmitting antennas, #1, #2, is subjected to frequency division multiplexing (Method 12). For another example, as shown in FIGS. 18(*a*) and 18(*b*), the feedback control information is subjected to multi-carrier transmission using different resource blocks in one subframe of the PUCCH in one CC. Alternately, as shown in FIG. 18(*c*), the feedback control information is subjected to multi-carrier transmission using one slot of the PUCCH in a plurality (two) of CCs. Further, intra-subframe frequency hopping is adopted to obtain frequency diversity gain.

Also in such a transmission method, as compared with the case of single-stream transmission, it is possible to transmit number-of-transmitting-antenna-times feedback control information. Further, since a signal per transmitting antenna is of single-carrier transmission, the PAPR does not increase. In addition, to further increase the transmission amount of the feedback control information, M-ary data modulation (8 PSK, 16QAM, etc.) may be applied as in the above-mentioned Method 1.

Figure 19:
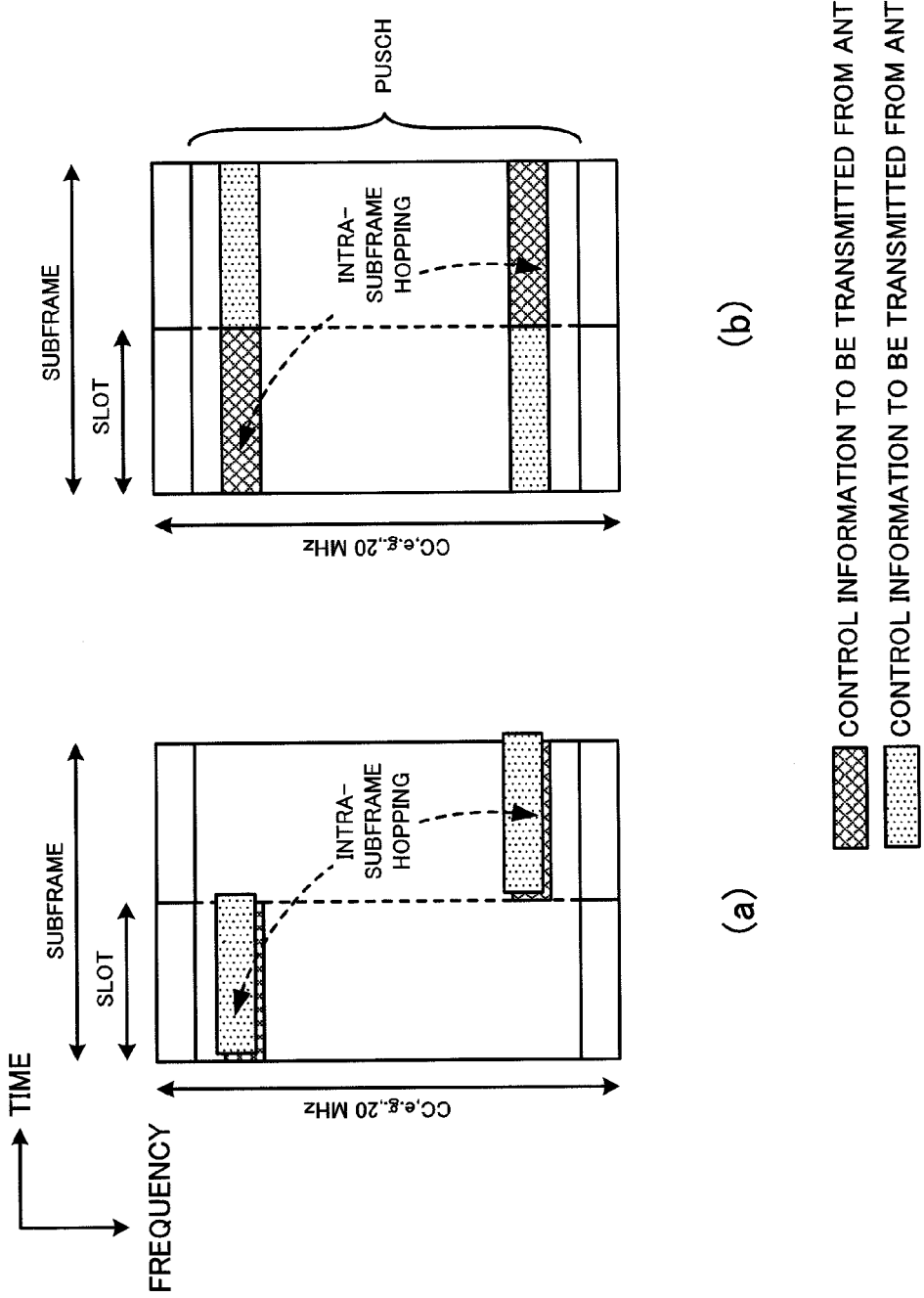
FIGS. 19(a) and 19(b) are other diagrams to explain the format to transmit the uplink control information in the mobile terminal apparatus according to Embodiment 4 of the invention.

Next, there is a method of transmitting on the PUSCH using a plurality of radio resources. In this method, as shown in FIG. 19(*a*), the feedback control information to be transmitted from a plurality of transmitting antennas, #1, #2, is orthogonally code-division multiplexed into one slot of the PUSCH. In other words, as shown in FIG. 19(*a*), the feedback control information is orthogonally code-division multiplexed and mapped into radio resources (resource blocks) of the same frequency and time of the PUSCH and is subjected to multi-code transmission. Further, as shown in FIG. 19(*b*), the feedback control information transmitted from a plurality of transmitting antennas, #1, #2, is subjected to frequency division multiplexing. In other words, as shown in FIGS. 19(*a*) and 19(*b*), the feedback control information is subjected to multi-carrier transmission using different resource blocks in one subframe of the PUSCH. Further, intra-subframe frequency hopping is adopted to obtain frequency diversity gain.

In such a transmission method, it is possible to transmit in a suitable transmission bandwidth corresponding to the feedback control information amount, and it is thereby possible to reduce overhead for feedback. Further, since a signal per transmitting antenna is of single-carrier transmission, the PAPR does not increase.

Figure 20:
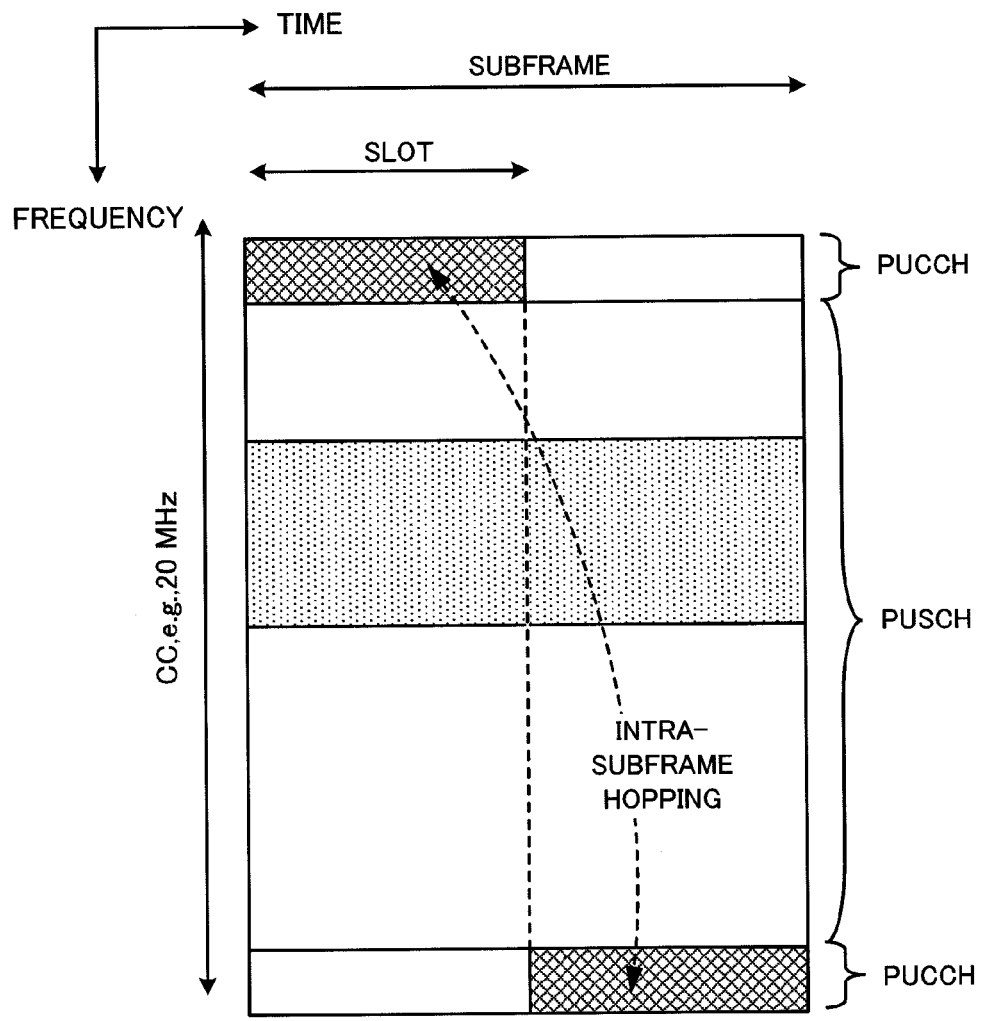
FIG. 20 is still another diagram to explain the format to transmit the uplink control information in the mobile terminal apparatus according to Embodiment 4 of the invention.

Next, there is a method of transmitting the feedback control information and data signal using the PUSCH and PUCCH. For example, as shown in FIG. 20, the feedback control information is transmitted on the PUCCH, and the data signal is transmitted on the PUSCH. In other words, as shown in FIG. 20, the feedback control information is mapped to one slot of the PUCCH, the data signal is mapped to one subframe of the PUSCH, and the feedback control information and the data signal are transmitted. In this case, the feedback control information to be transmitted on the PUCCH and the data signal to be transmitted on the PUSCH are transmitted from different transmitting antennas, #1, #2. Further, on the PUCCH, intra-subframe frequency hopping is adopted to obtain frequency diversity gain.

In such a transmission method, since the feedback control information and the data signal are transmitted respectively from different transmitting antennas, a signal per transmitting antenna is of single-carrier transmission, and therefore, the PAPR does not increase. In addition, the example as shown in FIG. 20 shows the case of transmitting the feedback control information on the PUCCH, while transmitting the data signal on the PUSCH, and in this transmission method, different types of feedback control information may be separated to be transmitted on the PUCCH and PUSCH. For example, the CQI may be transmitted on the PUCCH, while ACK/NACK and the data signal may be time-division multiplexed into the PUSCH and transmitted. In addition, to further increase the transmission amount of the feedback control information, M-ary data modulation (8 PSK, 16QAM, etc.) may be applied as in the above-mentioned Method 1.

Figure 21:
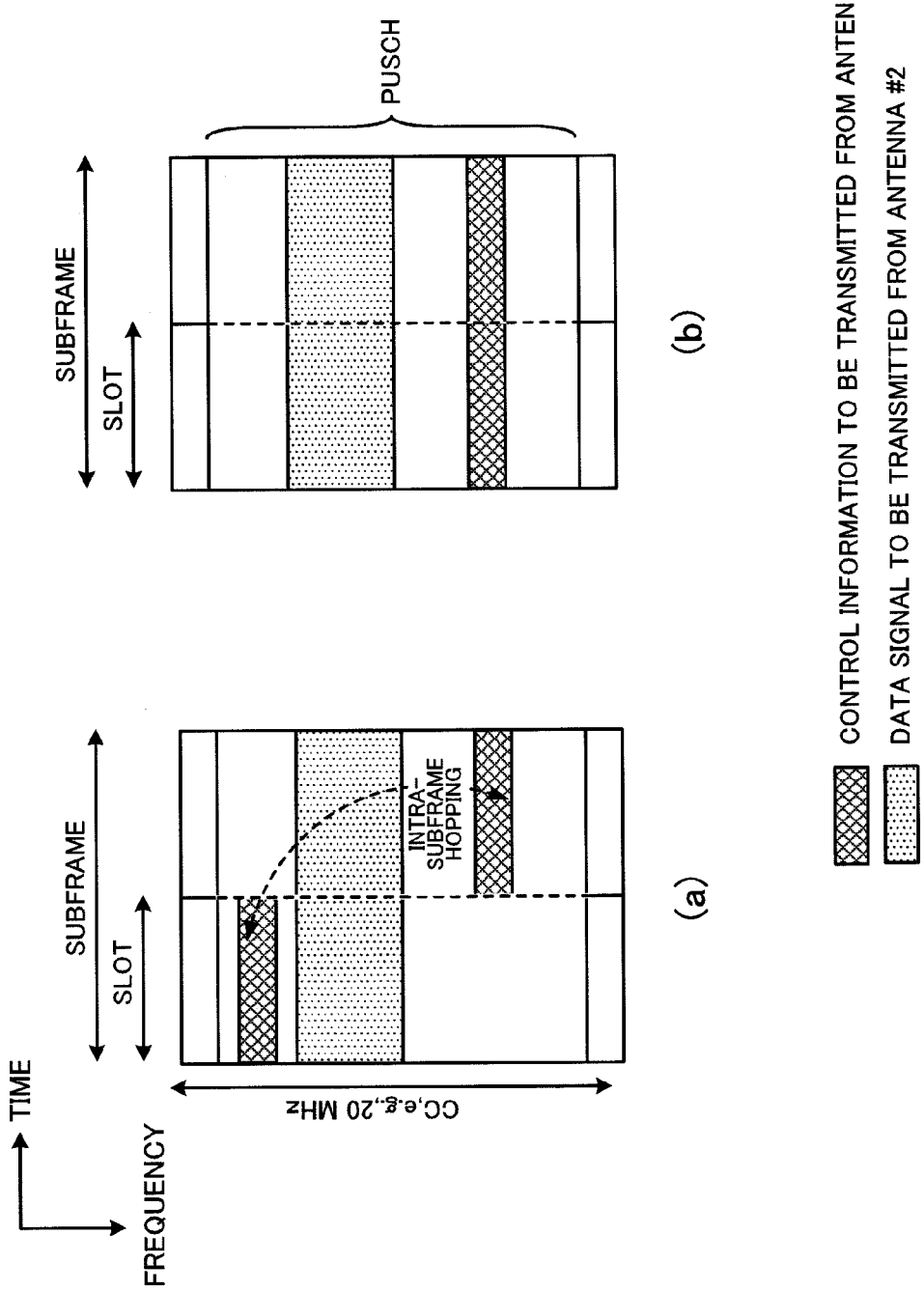
FIGS. 21(a) and 21(b) are other diagrams to explain the format to transmit the uplink control information in the mobile terminal apparatus according to Embodiment 4 of the invention.

Next, there is a method of transmitting the feedback control information and data signal on the PUSCH using a plurality of radio resources. For example, as shown in FIGS. 21(*a*) and 21(*b*), the feedback control information and the data signal are concurrently transmitted from different radio resources of the PUSCH. In other words, as shown in FIG. 21(*a*), the feedback control information is mapped to one slot of the PUSCH, the data signal is mapped to one subframe in a frequency region different from a frequency region for transmitting the feedback control information on the PUSCH, and the feedback control information and the data signal are transmitted. In this case, for the feedback control information, intra-subframe frequency hopping is adopted to obtain frequency diversity gain. Alternately, as shown in FIG. 21(*b*), the feedback control information is mapped to one subframe in a particular frequency region of the PUSCH, the data signal is mapped to one subframe in another frequency region of the PUSCH, and the feedback control information and the data signal are transmitted. In these cases, the feedback control information and the data signal are transmitted from different transmitting n antennas, #1, #2.

In such a transmission method, since the feedback control information and the data signal are transmitted respectively from different transmitting antennas, a signal per transmitting antenna is of single-carrier transmission, and therefore, the PAPR does not increase. Further, it is possible to transmit in a suitable transmission bandwidth corresponding to the feedback control information amount, and it is thereby possible to transmit the larger amount of feedback control information than in the LTE system.

In the above-mentioned description, described is the case of transmitting the feedback control information using a plurality of transmitting antennas, #1, #2 or the case of transmitting the feedback control information and the data signal using a plurality of transmitting antennas, #1, #2. From the viewpoint of power consumption of the mobile terminal apparatus, it is not desirable to always perform transmission using a plurality of transmitting antennas, and it is desirable to perform transmission using a plurality (2~4) of transmitting antennas as necessary. Described herein is the case of switching from single-stream transmission to multi-stream transmission.

As the case of performing multi-stream transmission, for example, there are (1) the case of transmitting the feedback control information corresponding to a plurality (two or more) of downlink CCs as feedback, (2) the case of concurrently transmitting two or more types of information (for example, ACK/NACK and CQI, feedback control information and data signal, etc.), (3) the case that coverage decreases (increases in PAPR) in performing multi-code transmission/multi-carrier transmission in single-stream transmission, etc.

In these cases, by applying multi-stream transmission, in above-mentioned (1), it is possible to support increases in the information amount required for feedback by increasing the number of transmitting antennas. Further, in above-mentioned (2), it is possible to support increases in the type of information required for feedback by increasing the number of transmitting antennas. Furthermore, in above-mentioned (3), by increasing the number of antennas, single-carrier transmission is performed in each antenna, and the PAPR is thereby prevented from increasing.

Figure 22:
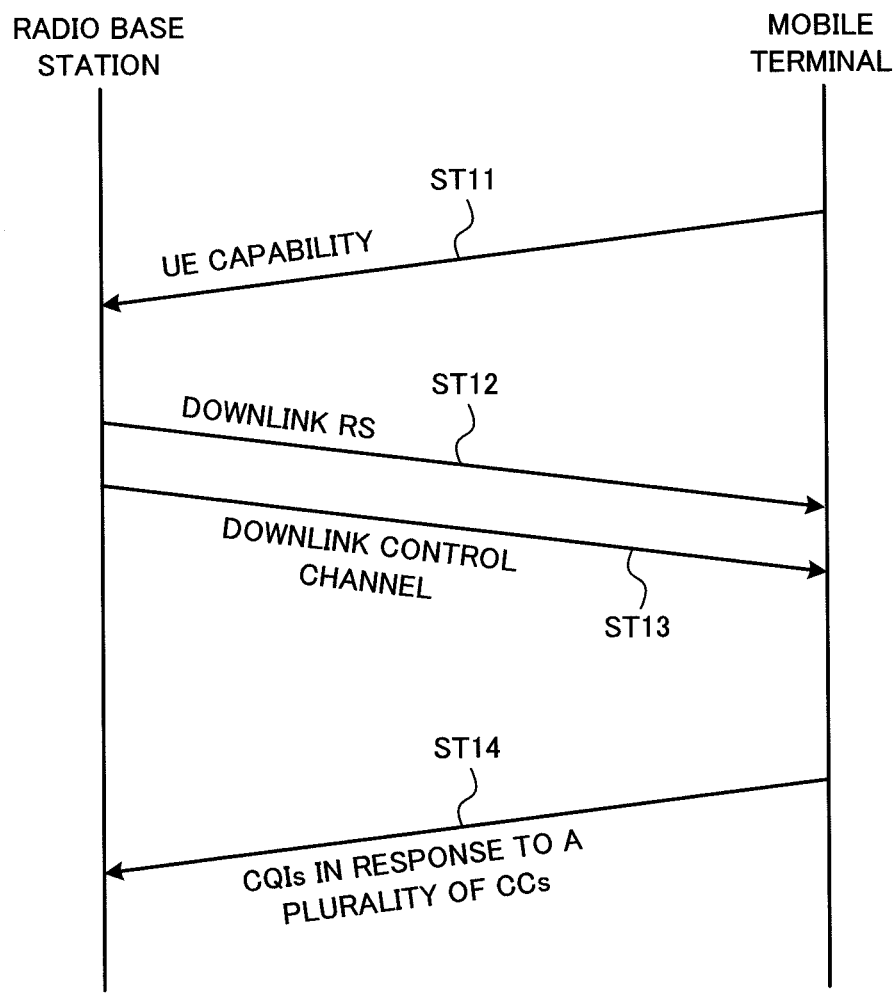
FIG. 22 is a sequence diagram in the case of switching from single-stream transmission to multi-stream transmission in Embodiment 4 of the invention.

In the above-mentioned cases (1) and (2), single-stream transmission is switched to multi-stream transmission according to the sequence as shown in FIG. 22. In other words, first, the mobile terminal notifies the radio base station (network) of the UE capability (ST 11). By this means, the radio base station obtains the information of the number of antennas that the mobile terminal is capable of transmitting. In other words, when the mobile terminal is an LTE-system-capable mobile terminal, since single-stream transmission is permitted, the UE capability indicates that the number of transmitting antennas is "1". When the mobile terminal is an LTE-A-system-capable mobile terminal, since multi-stream transmission is permitted, the UE capability indicates that the number of transmitting antennas is "2" to "4".

Next, when the mobile terminal is an LTE-A-system-capable mobile terminal, the radio base station transmits the reference signal (RS) to the mobile terminal using a plurality (herein, two) of CCs (ST 12). In addition, the radio base station transmits the RS using two CCs, and therefore, knows that the mobile terminal transmits the feedback control information (for example, CQI) corresponding to two CCs as feedback. Further, the radio base station notifies of information of radio resources to be used in transmitting the feedback control information (for example, CQI) as feedback in uplink, by using the PDCCH (UL grant) (ST 13). The radio resource information includes the resource mapping information, and transmitting antenna assignment information, for example, such that the feedback control information of downlink CC #1 is transmitted using the transmitting antenna #1 and that the feedback control information of downlink CC #2 is transmitted using the transmitting antenna #2.

Next, according to the radio resource information, the mobile terminal transmits the feedback control information (for example, CQI) corresponding to two CCs to the radio base station (ST 14). For example, since the mobile terminal receives RSs corresponding to two downlink CCs, using the radio resource information, the mobile terminal transmits the CQIs corresponding to two CCs to the radio base station as feedback by multi-code transmission as shown in FIG. 17 (Method 11).

Figure 23:
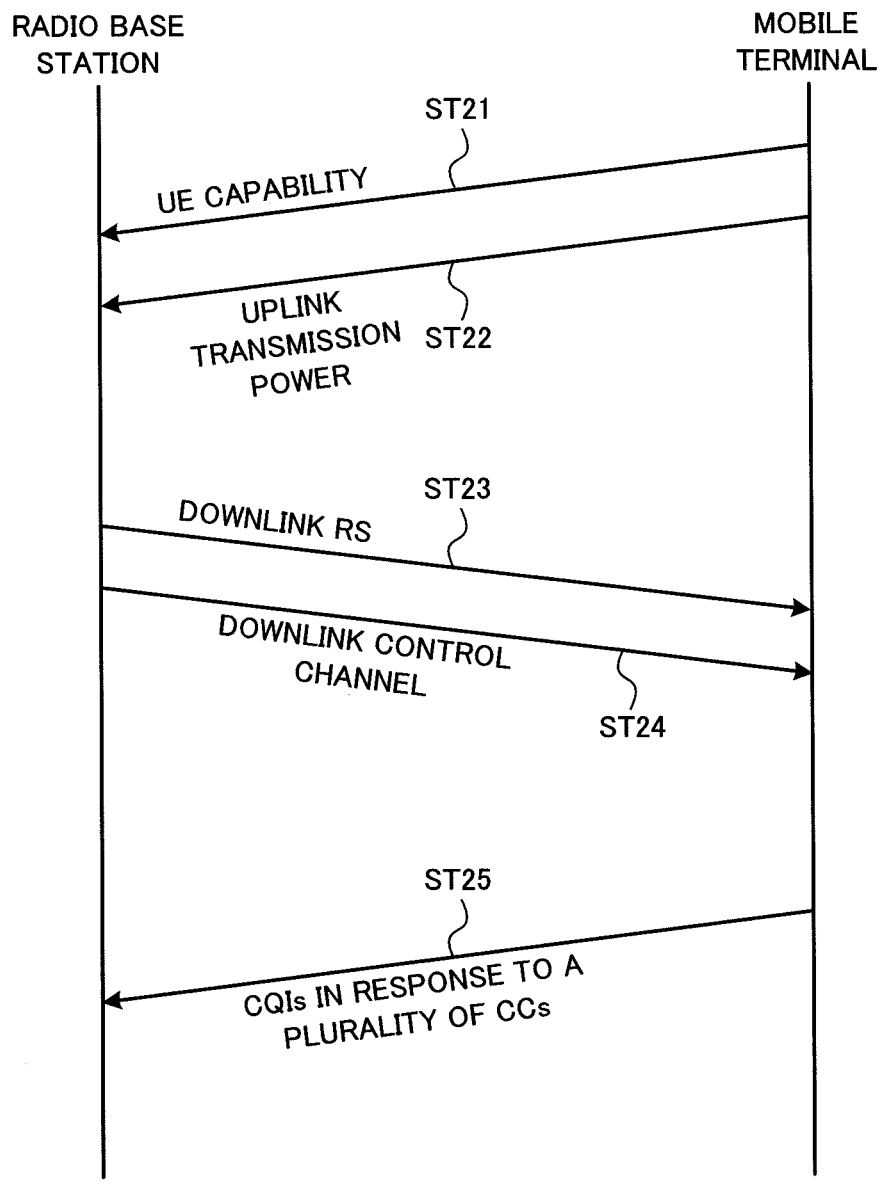
FIG. 23 is another sequence diagram in the case of switching from single-stream transmission to multi-stream transmission in Embodiment 4 of the invention.

In the above-mentioned case (3), single-stream transmission is switched to multi-stream transmission according to the sequence as shown in FIG. 23. In other words, first, the mobile terminal notifies the radio base station (network) of the UE capability (ST 21). By this means, the radio base station obtains the information of the number of antennas that the mobile terminal is capable of transmitting. In other words, when the mobile terminal is an LTE-system-capable mobile terminal, since single-stream transmission is permitted, the UE capability indicates that the number of transmitting antennas is "1". When the mobile terminal is an LTE-A-system-capable mobile terminal, since multi-stream transmission is permitted, the UE capability indicates that the number of transmitting antennas is "2" to "4". Further, the mobile terminal notifies the radio base station of information indicative of the level of the transmission power that can be increased (margin of the uplink transmission power) (ST 22).

Next, when the mobile terminal is an LTE-A-system-capable mobile terminal, the radio base station transmits the reference signal (RS) to the mobile terminal using a plurality (herein, two) of CCs (ST 23). In addition, the radio base station transmits the RS using two CCs, and therefore, knows that the mobile terminal transmits the feedback control information (for example, CQI) corresponding to two CCs as feedback. Further, the radio base station notifies of information of radio resources to be used in transmitting the feedback control information (for example, CQI) as feedback in uplink, using the PDCCH (UL grant) (ST 24). At this point, in consideration of the margin of uplink transmission power, it is determined whether multi-code transmission is performed using one transmitting antenna or multi-code transmission is performed using a plurality (for example, two) of transmitting antennas. For example, the number of transmitting antennas is determined in consideration of a difference between the PAPR in performing multi-code transmission using one transmitting antenna and the PAPR in performing multi-code transmission using two transmitting antennas, and the margin of uplink transmission power. In addition, the radio resource information includes the resource mapping information, and transmitting antenna assignment information, for example, such that the feedback control information of downlink CC #1 is transmitted using the transmitting antenna #1 and that the feedback control information of downlink CC #2 is transmitted using the transmitting antenna #2.

Next, according to the radio resource information, the mobile terminal transmits the feedback control information (for example, CQI) corresponding to two CCs to the radio base station (ST 25). For example, since the mobile terminal receives RSs corresponding to two downlink CCs, using the radio resource information, the mobile terminal transmits the CQIs corresponding to two CCs to the radio base station as feedback by multi-code transmission as shown in FIG. 17 (Method 11).

Figure 24:
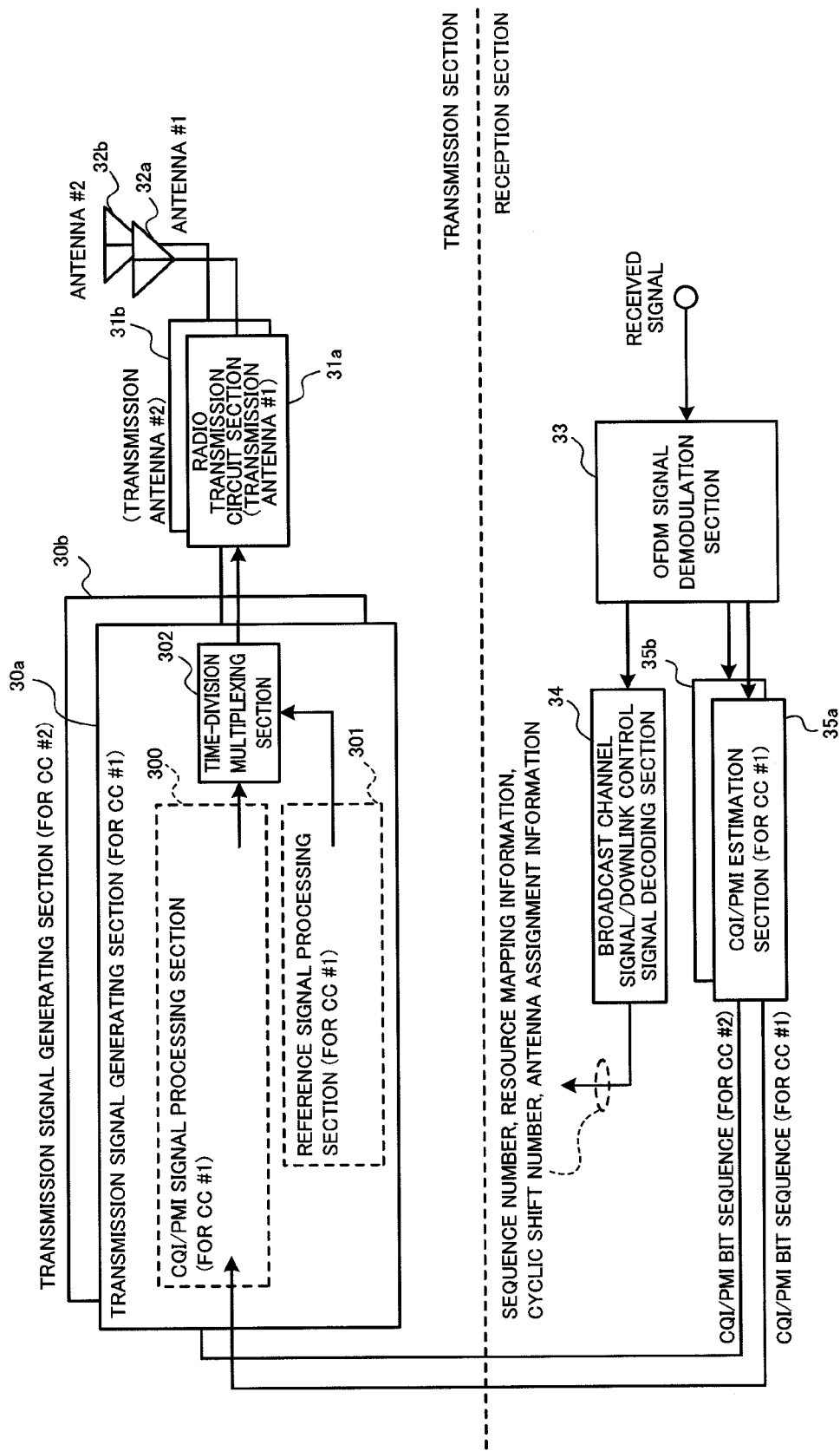
FIG. 24 is a diagram illustrating a schematic configuration of a mobile terminal apparatus according to Embodiment 4 of the invention.

FIG. 24 is a diagram illustrating a schematic configuration of a mobile terminal apparatus according to Embodiment 4 of the invention. In FIG. 24, the case of multi-code transmission is described such that the feedback control information (CQI/PMI signal) for downlink CC #1 is transmitted from the transmitting antenna #1 and that the feedback control information (CQI/PMI signal) for downlink CC #2 is transmitted from the transmitting antenna #2.

The mobile terminal apparatus as shown in FIG. 24 is provided with a transmission section and a reception section. The transmission section is provided with transmission signal generating sections 30*a* and 30*b*, radio transmission circuit sections 31*a* and 31*b*, and antennas 32*a* and 32*b*. In the mobile terminal apparatus, a CQI/PMI signal for downlink CC #1 is transmitted using the transmission signal generating section 30*a*, radio transmission circuit section 31*a*, and antenna 32*a*, while a CQI/PMI signal for downlink CC #2 is transmitted using the transmission signal generating section 30*b*, radio transmission circuit section 31*b*, and antenna 32*b*.

Figure 25:
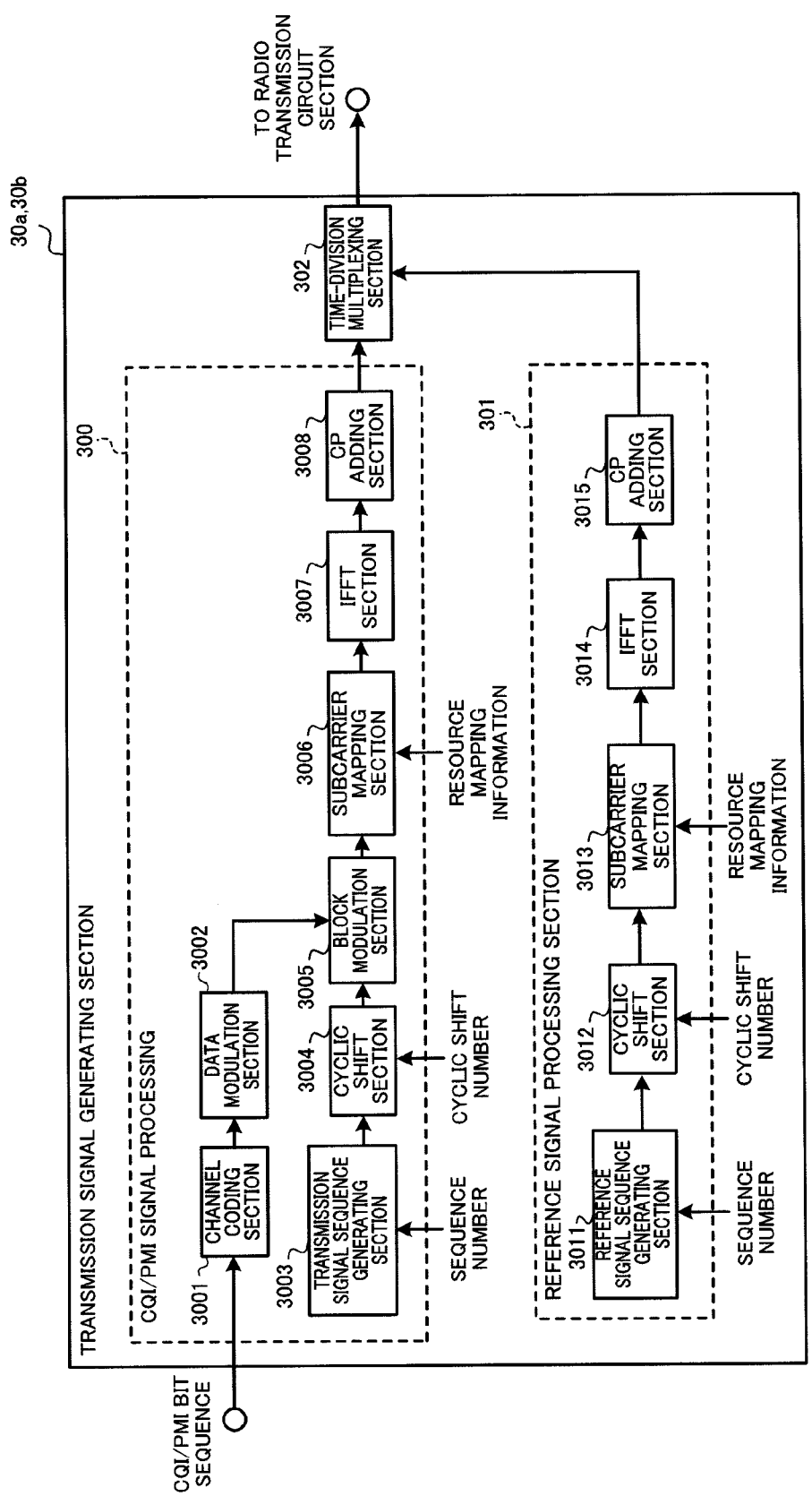
FIG. 25 is a diagram illustrating a detailed configuration of the mobile terminal apparatus shown in FIG. 24.

The transmission signal generating sections 30*a* and 30*b* generate CQI/PMI signals for respective downlink CCs. Each of the transmission signal generating sections 30*a* and 30*b* is provided with a CQI/PMI signal processing section 300, reference signal processing section 301, and time-division multiplexing section 302 that time-division multiplexes the CQI signal and reference signal. The CQI/PMI signal processing section 300 and reference signal processing section 301 in each of the transmission signal generating sections 30*a* and 30*b* adopt configurations as shown in FIG. 25, for example.

The CQI/PMI signal processing section 300 has a channel coding section 3001 that performs error-correcting coding on a CQI/PMI bit sequence, a data modulation section 3002 that performs data modulation on the channel-coded data signal, a transmission signal sequence generating section 3003 that generates a transmission signal sequence associated with the sequence number, a cyclic shift section 3004 that cyclically shifts the transmission signal sequence, a block modulation section 3005 that performs block modulation on the transmission signal sequence with the data-modulated signal, a subcarrier mapping section 3006 that performs mapping of the block-modulated signal to subcarriers, an IFFT section 3007 that performs IFFT on the mapped signal, and a CP adding section 3008 that adds a CP to the IFFT-processed signal.

The reference signal processing section 301 has a reference signal sequence generating section 3011 that generates a reference signal sequence associated with the sequence number, a cyclic shift section 3012 that cyclically shifts the reference signal sequence, a subcarrier mapping section 3013 that performs mapping of the cyclically-shifted signal to subcarriers, an IFFT section 3014 that performs IFFT on the mapped signal, and a CP adding section 3015 that adds a CP to the IFFT-processed signal.

The mobile terminal apparatus receives broadcast channel signals on the broadcast channel and downlink control signals on the downlink control channel. The mobile terminal apparatus decodes the signals, and thereby obtains the sequence number of the transmission signal, the sequence number of the reference signal, resource mapping information, the cyclic shift number, antenna assignment information, etc. Then, the sequence number is output to the transmission signal sequence generating section 3003 of the CQI/PMI signal processing section 300 and the reference signal sequence generating section 3011 of the reference signal processing section 301, the resource mapping information is output to the subcarrier mapping sections 3006 and 3013, and the cyclic shift number is output to the cyclic shift sections 3004 and 3012. Further, the antenna assignment information is output to the transmission signal generating sections 30a and 30b.

The channel coding section 3001 performs error-correcting coding on a data sequence to transmit. The channel coding section 3001 outputs the data signal subjected to error-correcting coding to the data modulation section 3002. The data modulation section 3002 performs data modulation on the channel-coded data signal. The data modulation section 3002 outputs the data-modulated data signal to the block modulation section 3005.

The transmission signal sequence generating section 3003 generates a transmission signal sequence associated with the sequence number. The transmission signal sequence generating section 3003 outputs the transmission signal sequence to the cyclic shift section 3004. The cyclic shift section 3004 provides the transmission signal sequence with a cyclic shift amount associated with the cyclic shift number. Herein, the cyclic shift used in the transmission signal generating section 30a for downlink CC #1 is different from the cyclic shift used in the transmission signal generating section 30b for downlink CC #2. The cyclic shift section 3004 outputs the cyclically-shifted signal to the block modulation section 3005.

The block modulation section 3005 performs block modulation on the transmission signal sequence with the data-modulated data signal on a basis of block corresponding to one SC-FDMA. The block modulation section 3005 outputs the block-modulated signal to the subcarrier mapping section 3006. The subcarrier mapping section 3006 performs mapping of the block-modulated signal to subcarriers based on the resource mapping information. The subcarrier mapping section 3006 outputs the data signal subjected to subcarrier mapping to the IFFT section 3007.

The IFFT section 3007 performs IFFT on the signal subjected to subcarrier mapping, and transforms to a signal in the time domain. The IFFT section 3007 outputs the IFFT-processed signal to the CP adding section 3008. The CP adding section 3008 adds a CP to the IFFT-processed signal. The CP adding section 3008 outputs the CP-added signal to the time-division multiplexing section 302. The reference signal sequence generating section 3011 of the reference signal processing section 301 generates a reference signal sequence associated with the sequence number. The reference signal sequence generating section 3011 outputs the reference signal sequence to the cyclic shift section 3012. The cyclic shift section 3012 provides the reference signal sequence with a cyclic shift amount associated with the cyclic shift number. Herein, the cyclic shift used in the transmission signal generating section 30a for downlink CC #1 is different from the cyclic shift used in the transmission signal generating section 30b for downlink CC #2. The cyclic shift section 3012 outputs the cyclically-shifted signal to the subcarrier mapping section 3013.

The subcarrier mapping section 3013 performs mapping of the signal in the frequency domain to subcarriers based on the resource mapping information. The subcarrier mapping section 3013 outputs the mapped reference signal to the IFFT section 3014. The IFFT section 3014 performs IFFT on the mapped signal, and transforms to a signal in the time domain. The IFFT section 3014 outputs the IFFT-processed reference signal to the CP adding section 3015. The CP adding section 3015 adds a CP to the IFFT-processed reference signal. The CP adding section 3015 outputs the CP-added signal to the time-division multiplexing section 302. The time-division multiplexing section 302 time-division multiplexes the signal from the CQI/PMI signal processing section 300 and the reference signal from the reference signal processing section 301 to output to the radio transmission circuit sections 31a and 31b.

In this way, each of the transmission signal generating sections 30a and 30b performs the orthogonal multiplexing on the CQI/PMI signal with a different orthogonal code (cyclic shift amount), and transmits the CQI/PMI signal subjected to the orthogonal multiplexing to the radio base station apparatus from a respective different antenna #1 or #2. In other words, as shown in FIG. 17, the feedback control information is orthogonally code-division multiplexed and mapped into radio resources (resource blocks) of the same frequency and time of the PUCCH and is subjected to multi-code transmission.

The reception section has an OFDM signal demodulation section 33 that demodulates an OFDM signal, a broadcast channel signal/downlink control signal decoding section 34 that decodes a broadcast channel signal and downlink control signal, and CQI/PMI estimation sections 35a and 35b that estimate the CQI/PMI for each CC using the reference signal included in the downlink signal.

The OFDM signal demodulation section 33 receives a downlink OFDM signal to demodulate. In other words, the section 33 removes the CP from the downlink OFDM signal, performs Fast Fourier Transform, extracts subcarriers assigned the broadcast channel signal or downlink control signal, and performs data demodulation. The OFDM signal demodulation section 33 outputs the signal subjected to data demodulation to the broadcast channel signal/downlink control signal decoding section 34 and CQI/PMI estimation sections 35a and 35b.

The broadcast channel signal/downlink control signal decoding section 34 decodes the signal subjected to data demodulation, and obtains the sequence number, resource mapping information (including the resource block number), the cyclic shift number, antenna assignment information, etc. The broadcast channel signal/downlink control signal decoding section 34 outputs the sequence number to the transmission signal sequence generating section 3003 and reference signal sequence generating section 3011, outputs the resource mapping information to the subcarrier mapping sections 3006 and 3013, outputs the cyclic shift number to the cyclic shift sections 3004 and 3012, and outputs the antenna assignment information to the transmission signal generating sections 30a and 30b.

The CQI/PMI estimation sections 35a and 35b estimate the CQI used in scheduling, adaptive radio link control (AMC) and the like in the radio base station apparatus, using the reference signal of each CC, while estimating PMI used in MIMO transmission, and generate CQI/PMI bit sequences for each CC. The CQI/PMI estimation sections 35a and 35b output the CQI/PMI bit sequences of each CC to the channel coding section 3001 of the transmission signal generating sections 30a and 30b, respectively.

Figure 26:
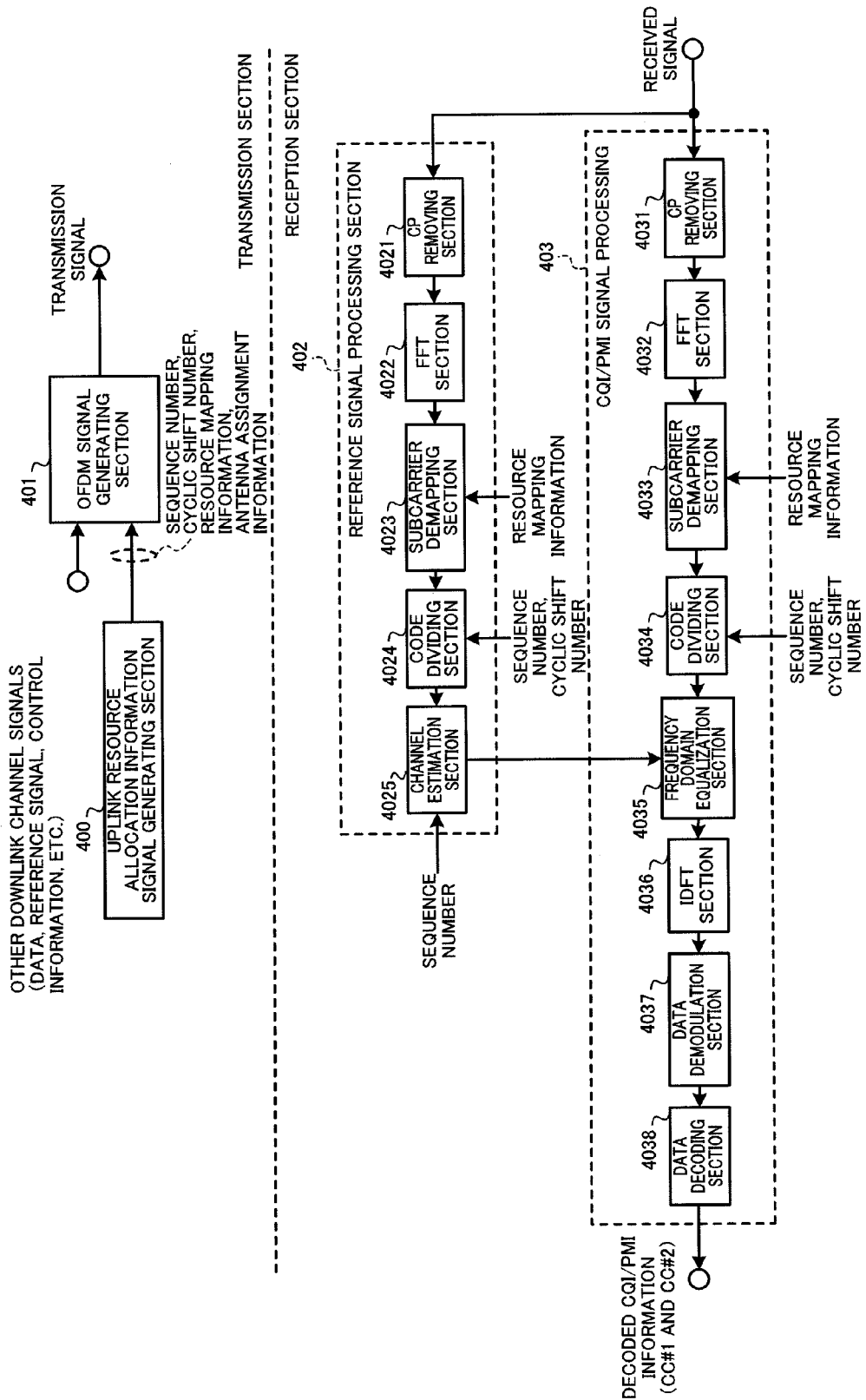
FIG. 26 is a diagram illustrating a schematic configuration of a radio base station apparatus according to Embodiment 4 of the invention.

FIG. 26 is a diagram illustrating a schematic configuration of the radio base station apparatus according to Embodiment 4 of the invention. The radio base station apparatus as shown in FIG. 26 is provided with a transmission section and a reception section. The transmission section has an uplink resource allocation information signal generating section 400, and an OFDM signal generating section 401 that multiplexes other downlink channel signals and uplink resource allocation information signal to generate an OFDM signal. The other downlink channel signals include data, reference signal, control signal, etc. and the uplink resource allocation information signal includes the sequence number, resource mapping information, the cyclic shift number, antenna assignment information, etc.

In addition, the sequence number, resource mapping information, the cyclic shift number and antenna assignment information may be transmitted to the mobile terminal apparatus on the broadcast channel, or may be transmitted to the mobile terminal apparatus on the downlink control channel. Alternately, the sequence number, resource mapping information, the cyclic shift number and antenna assignment information may be notified to the mobile terminal apparatus by an upper layer.

The uplink resource allocation information signal generating section 401 generates the sequence number (transmission signal sequence number, reference signal sequence number), resource mapping information, the cyclic shift number and antenna assignment information, and outputs these pieces of information to the OFDM signal generating section 401. The uplink resource allocation information signal generating section 401 determines whether to perform multi-code transmission using one transmitting antenna or to perform multi-code transmission using a plurality (for example, two) of transmitting antennas to be the antenna assignment information, from the margin of uplink transmission power and UE capability notified from the mobile terminal apparatus. The antenna assignment information also includes information indicative of the antenna used in transmitting a CQI/PMI signal and of a CC for which the CQI/PMI signal is transmitted.

The OFDM signal generating section 401 performs mapping of the downlink signal including the other downlink channel signals and uplink resource allocation information signal to subcarriers, performs IFFT, adds a CP, and thereby generates a downlink transmission signal.

The reception section has a reference signal processing section 402 and CQI/PMI signal processing section 403. The reception section receives the CQI/PMI signal subjected to orthogonal multiplexing processing with different codes (cyclic shift amounts) for each CC via uplink.

The reference signal processing 402 has a CP removing section 4021 that removes a CP from the received signal, an FFT section 4042 that performs FFT on the CP-removed signal, a subcarrier demapping section 4023 that performs demapping of the FFT-processed signal, a code dividing section 4024 that divides into reference signals for each user, while dividing into reference signals for each CC (antenna), and a channel estimation section 4025 that estimates channel variation using the reference signal subjected to code dividing.

The CQI/PMI signal processing section 403 has a CP removing section 4031 that removes a CP from the received signal, an FFT section 4032 that performs FFT on the CP-removed received signal, a subcarrier demapping section 4033 that performs demapping of the FFT-processed signal, a code dividing section 4034 that divides into CQI/PMI signals for each user, while dividing into CQI/PMI signals for each CC (antenna), a frequency domain equalization section 4035 that compensates the code-divided CQI/PMI signal for channel variations, an IDFT section 4036 that performs IDFT on the signal compensated for channel variations, a data demodulation section 4037 that performs data demodulation on the IDFT-processed data signal, and a data decoding section 4038 that performs data decoding on the signal subjected to data demodulation.

With respect to the reference signal, the CP removing section 4021 of the reference signal processing section 402 removes a portion corresponding to the CP from the received signal and extracts an effective signal portion. The CP removing section 4021 outputs the CP-removed signal to the FFT section 4022. The FFT section 4022 performs FFT on the CP-removed signal to transform into a signal in the frequency domain. The FFT section 4022 outputs the FFT-processed signal to the subcarrier demapping section 4023. The subcarrier demapping section 4023 extracts the reference signal from the signal in the frequency domain using the resource mapping information. The subcarrier demapping section 4023 outputs the reference signal to the code dividing section 4024.

The code dividing section 4024 divides into the reference signals for each CC (antenna) that are orthogonally multiplexed by the cyclic shift using the sequence number and the cyclic shift number. Further, the code dividing section 4024 divides into the reference signals for each user that are orthogonally multiplexed by the cyclic shift using the sequence number and the cyclic shift number. The code dividing section 4024 outputs the code-divided reference signal to the channel estimation section 4025. The channel estimation section 4025 performs channel estimation using the sequence number and the code-divided reference signal. In other words, the channel estimation section 4025 compares a known subcarrier obtained from the sequence number with the subcarrier of the reference signal subjected to user division to estimate channel variations. The channel estimation section 4025 outputs the estimated channel variations to the frequency domain equalization section 4035 of the CQI/PMI signal processing section 403.

With respect to the CQI/PMI signal, the CP removing section 4031 of the CQI/PMI signal processing section 403 removes a portion corresponding to the CP from the received signal and extracts an effective signal portion. The CP removing section 4031 outputs the CP-removed signal to the FFT section 4032. The FFT section 4032 performs FFT on the CP-removed signal to transform into a signal in the frequency domain. The FFT section 4032 outputs the FFT-processed signal to the subcarrier demapping section 4033. The subcarrier demapping section 4033 extracts the CQI/PMI signal from the signal in the frequency domain using the resource mapping information. The subcarrier demapping section 4033 outputs the CQI/PMI signal to the code dividing section 4024.

The code dividing section 4034 divides into the CQI/PMI signals for each CC (antenna) that are orthogonally multiplexed by the cyclic shift using the sequence number and the cyclic shift number. Further, the code dividing section 4034 divides into the CQI/PMI signals for each user that are orthogonally multiplexed by the cyclic shift using the sequence number and the cyclic shift number. The code dividing section 4034 outputs the code-divided CQI/PMI signal to the frequency domain equalization section 4035.

The frequency domain equalization section 4035 compensates the code-divided CQI/PMI signal for the channel variations estimated in the channel estimation section 4025. The frequency domain equalization section 4035 outputs the equalized CQI/PMI signal to the IDFT section 4036. The IDFT section 4036 transforms the signal in the frequency domain into a signal in the time domain. The IDFT section 4036 outputs the IDFT-processed signal to the data demodulation section 4037.

The data demodulation section 4037 performs data demodulation on the IDFT-processed signal. The data demodulation section 4037 outputs the CQI/PMI signal subjected to data demodulation to the data decoding section 4038. The data decoding section 4038 performs data decoding on the CQI/PMI signal subjected to data demodulation to output as CQI/PMI information for each CC. Thus, the CQI/PMI signal that is orthogonally multiplexed and subjected to multi-code transmission is code-divided to CQI/PMI signals for each CC (antenna).

Described is a radio communication method according to the invention using the radio base station apparatus and mobile terminal apparatus having the above-mentioned configurations.

First, the uplink resource allocation information signal generating section 400 of the radio base station apparatus determines the antenna to be used in transmitting a CQI/PMI signal and a CC for which the CQI/PMI signal is transmitted in the antenna assignment information when it is necessary to transmit the CQI/PMI signal in multi-stream transmission. The OFDM signal generating section 401 multiplexes the uplink resource allocation information including the sequence number (transmission signal sequence number, reference signal sequence number), resource mapping information (including the resource block number), the cyclic shift number, and the antenna assignment information and the other downlink channel signals to be an OFDM signal, and the OFDM signal is transmitted as a downlink transmission signal.

In the mobile terminal apparatus, the OFDM signal demodulation section 33 receives the downlink OFDM signal to demodulate. Then, the broadcast channel signal/downlink control signal decoding section 34 extracts the sequence number (transmission signal sequence number, reference signal sequence number), resource mapping information, the cyclic shift number, and the antenna assignment information, outputs the transmission signal sequence number to the transmission signal sequence generating section 3003, outputs the reference signal sequence number to the reference signal sequence generating section 3011, outputs the resource mapping information to the subcarrier mapping sections 3006 and 3013, outputs the cyclic shift number to the cyclic shift sections 3004 and 3012, and outputs the antenna assignment information to the transmission signal generating sections 30a and 30b. Herein, the assignment is made so that a CQI/PMI signal for CC #1 is transmitted using the transmitting antenna #1 and that a CQI/PMI signal for CC #2 is transmitted using the transmitting antenna #2. Accordingly, the CQI/PMI signal for CC #1 is generated in the transmission signal generating section 30a, and the CQI/PMI signal for CC #2 is generated in the transmission signal generating section 30b.

The channel coding section 3001 performs channel coding on the CQI/PMI bit sequence with a channel-coding rate broadcast from the radio base station apparatus. Next, the data modulation section 3002 performs data modulation on the channel-coded data signal with a data modulation scheme broadcast from the radio base station apparatus. Then, the cyclic shift section 3004 provides the transmission signal sequence with the cyclic shift associated with the cyclic shift number. Herein, the cyclic shift amount varies with each CC (antenna). By this means, CQI/PMI signals transmitted using different antennas are orthogonally multiplexed.

Next, the block modulation section 3005 performs block modulation on the cyclically-shifted transmission signal sequence with the data-modulated data signal. Then, the subcarrier mapping section 3006 performs mapping of the block-modulated data signal based on the resource mapping information. In this case, as shown in FIG. 17, the CQI/PMI signal to which orthogonal multiplexing is applied is mapped in a particular frequency domain. The IFFT section 3007 transforms the signal subjected to subcarrier mapping into a signal in the time domain by IFFT, and the CP adding section 3008 adds a CP to the signal.

Meanwhile, the cyclic shift section 3012 of the reference signal processing section 301 provides a plurality of subcarriers corresponding to the reference signal sequence with respective phase rotation. The cyclically-shifted signal is mapped in the subcarrier mapping section 3013 based on the resource mapping information. The IFFT section 3014 transforms the signal subjected to subcarrier mapping into a signal in the time domain by IFFT, and the CP adding section 3015 adds a CP to the signal.

Thus obtained CQI/PMI signal and reference signal are time-division multiplexed, and the uplink signal subjected to orthogonal multiplexing (cyclic shift) is transmitted to the radio base station apparatus. The radio base station apparatus receives the uplink signal that is multiplexed orthogonally between CCs (antennas).

In the radio base station apparatus, with respect to the reference signal, the CP removing section 4021 removes the CP. Next, the FFT section 4022 performs FFT on the CP-removed signal to be a signal in the frequency domain, and the subcarrier demapping section 4023 performs demapping from subcarriers based on the resource mapping information. The demapped reference signal is divided into reference signals for each CC (antenna) in the code dividing section 4024. Then, the channel estimation section 4025 estimates channel variations using the code-divided reference signals.

With respect to the CQI/PMI signal, the CP removing section 4031 removes the CP. Next, the FFT section 4032 performs FFT on the CP-removed signal to be a signal in the frequency domain, and the subcarrier demapping section 4033 performs demapping from subcarriers based on the resource mapping information. The demapped CQI/PMI signal is divided into CQI/PMI signals for each CC (antenna) in the code dividing section 4034, using the transmission signal sequence associated with the transmission signal sequence number and cyclic shift associated with the cyclic shift number.

Next, the frequency domain equalization section 4035 compensates for the channel variations estimated in the channel estimation section 4025, and subsequently, the IDFT section 4036 performs IDFT on the signal to transform into a signal in the time domain. Next, the data demodulation section 4037 performs data demodulation on the IDFT-processed CQI/PMI signal. Then, the data decoding section 4038 decodes the CQI/PMI signal subjected to data demodulation, and obtains the CQI/PMI information for each CC (antenna).

Thus, in this Embodiment, since the CQI/PMI signal that is the feedback control information for each CC is subjected to multi-code transmission (transmitted by different antennas for each CC), as compared with single-stream transmission, it is possible to transmit number-of-transmitting-antenna-times feedback control information. Further, since a signal per transmitting antenna is of single-carrier transmission, the PAPR does not increase.

The above-mentioned description is applied to the case of transmitting the feedback control information for downlink CCs in the format as shown in FIG. 17 from different antennas by multi-code transmission, and is similarly applicable to the case of transmitting the feedback control information for downlink CCs in the format as shown in FIG. 19(a) from different antennas by multi-code transmission, the case of transmitting the feedback control information for downlink CCs in the formats as shown in FIGS. 18(a) to 18(c) and FIG. 19(b) from different antennas by multi-carrier transmission, and the case of transmitting the feedback control information for downlink CCs and the data signal in the formats as shown in FIG. 20 and FIGS. 21(a) and 21(b) from different antennas by multi-carrier transmission.

In this case, the radio base station apparatus notifies the mobile terminal apparatus of the resource mapping information of each format, and the mobile terminal apparatus performs subcarrier mapping on the signal according to the resource mapping information. Further, in the case of multi-carrier transmission from different antennas, the code dividing sections 4024 and 4034 in the radio base station apparatus perform only user division. Furthermore, in the case that a signal to transmit with a particular antenna is a data signal, instead of the CQI/PMI signal processing section 300 in FIG. 24, the signal processing section 150 for PUSCH transmission in FIG. 15 is used in the configuration.

The present invention is not limited to the above-mentioned Embodiments, and is capable of being carried into practice with various modifications thereof. Above-mentioned Embodiments 1 and 4 describe the case that the feedback control information is a CQI signal, and Embodiment 2 describes the case that the feedback control information is an ACK/NACK signal, but the invention is not limited thereto, and is similarly applicable to the case that the feedback control information is all the feedback control information used in the LTE-A system including the CQI signal and ACK/NACK signal transmitted on the PUCCH.

Above-mentioned Embodiment 4 describes the case of two transmitting antennas to simplify the description, but the invention is not limited thereto, and is similarly applicable to the case of three or four transmitting antennas. Further, above-mentioned Embodiment 4 describes the aspect that the radio base station apparatus notifies the mobile terminal apparatus of the antenna assignment information, but the invention is not limited thereto, and it is possible to transmit the feedback control information and data signal using different antennas by multi-code transmission and multi-carrier transmission without notifying of the antenna assignment information, by beforehand determining the transmitting antenna to transmit the feedback control information and a downlink CC for which the feedback control information is transmitted, or the transmitting antenna to transmit a signal (feedback control information and data signal) and the type of the signal.

Further, without departing from the scope of the invention, the numbers of the processing sections and the processing procedures in the above-mentioned description are capable of being carried into practice with various modifications thereof as appropriate. Furthermore, each of elements shown in the figures indicates the function, and each function may be actualized by hardware or actualized by software. Moreover, the invention is capable of being carried into practice with various modifications thereof as appropriate without departing from the scope of the invention.

The present application is based on Japanese Patent Application No. 2009-108518 filed on Apr. 27, 2009, and Japanese Patent Application No. 2009-188761 filed on Aug. 17, 2009, entire contents of which are expressly incorporated by reference herein.

The invention claimed is:

1. A mobile terminal apparatus having a processor, the mobile terminal apparatus comprising:
    a reception section receiving a signal for each of a plurality of component carriers from a radio base station apparatus;
    a feedback control information generating section generating feedback control information from the signal;
    a plurality of transmitting antennas; and
    a mapping section code-multiplexing the feedback control information to be transmitted respectively from the plurality of transmitting antennas for multi-code transmission and mapping the feedback control information to radio resources of same frequency and time of an uplink control channel.

2. The mobile terminal apparatus according to claim 1, further comprising:
    a data modulation section performing M-ary data modulation on the feedback control information,
    wherein the mapping section performs mapping of the feedback control information subjected to the M-ary data modulation.

3. The mobile terminal apparatus according to claim 1, wherein the mapping section performs mapping of the feedback control information to an uplink shared channel and the uplink control channel.

4. The mobile terminal apparatus according to claim 1, wherein the mapping section performs mapping of the feedback control information in a format of multi-carrier transmission.

5. The mobile terminal apparatus according to claim 1, further comprising:
    a multiplexing section multiplexing the feedback control information orthogonally among users,
    wherein the mapping section performs mapping of the feedback control information that is orthogonally multiplexed among users.

6. The mobile terminal apparatus according to claim 1, wherein the mapping section performs mapping of the feedback control information to be transmitted respectively from the plurality of transmitting antennas in a format of intra-subframe frequency hopping in a component carrier.

7. The mobile terminal apparatus according to claim 1, wherein the mobile terminal apparatus transmits different types of feedback control information from the respective different transmitting antennas.

8. A radio communication method comprising the steps of:
    in a mobile terminal apparatus,
    receiving a signal for each of a plurality of component carriers from a radio base station apparatus;
    generating feedback control information from the signal; and
    code-multiplexing the feedback control information to be transmitted respectively from a plurality of transmitting antennas for multi-code transmission and mapping the feedback control information to radio resources of same frequency and time of an uplink control channel.

9. The radio communication method according to claim 8, further comprising the step of:
   in the mobile terminal apparatus, performing M-ary data modulation on the feedback control information.

10. The radio communication method according to claim 8, wherein the feedback control information is mapped to an uplink shared channel and the uplink control channel.

11. The radio communication method according to claim 8, further comprising the step of:
   in the mobile terminal apparatus, multiplexing the feedback control information orthogonally among users.

12. The radio communication method according to claim 8, further comprising the step of:
   in the mobile terminal apparatus, transmitting different types of feedback control information from the respective transmitting antennas.

13. The radio communication method according to claim 8, further comprising the step of:
   in the radio base station apparatus, determining whether the mobile terminal apparatus transmits the feedback control information using a different transmitting antenna, based on information of transmission power in uplink.

* * * * *